United States Patent [19]
Bowler et al.

[11] Patent Number: 5,227,713
[45] Date of Patent: Jul. 13, 1993

[54] VERNIER CONTROL SYSTEM FOR SUBSYNCHRONOUS RESONANCE MITIGATION

[75] Inventors: Colin E. J. Bowler, Niskayuna; Einar V. Larsen, Charlton; Daniel H. Baker, Niskayunua, all of N.Y.

[73] Assignee: Electric Power Research Institute, Palo Alto, Calif.

[21] Appl. No.: 883,474

[22] Filed: May 15, 1992

Related U.S. Application Data

[63] Continuation-in-part of Ser. No. 806,768, Dec. 13, 1991, and a continuation-in-part of Ser. No. 742,859, Aug. 8, 1991, Pat. No. 5,166,597.

[51] Int. Cl.$^5$ ........................................... H02K 11/00
[52] U.S. Cl. ..................................... 322/58; 307/102; 307/105; 323/210; 323/211; 323/218; 361/58
[58] Field of Search .................. 307/102, 105; 322/58; 323/205, 208, 209, 210, 211, 212, 218; 361/58, 107

[56] References Cited

U.S. PATENT DOCUMENTS

| | | | |
|---|---|---|---|
| 3,813,593 | 5/1974 | Tice et al. | 322/58 |
| 4,292,545 | 9/1981 | Hingorani | 307/102 |
| 4,302,715 | 11/1981 | Putman et al. | 323/210 |
| 4,311,253 | 1/1982 | Putman et al. | 322/58 |
| 4,355,241 | 10/1982 | Hingorani | 307/102 |
| 4,384,246 | 5/1983 | Larsen et al. | 322/58 |
| 4,434,376 | 2/1984 | Hingorani | 307/102 |
| 4,438,386 | 3/1984 | Gyugyi | 323/210 |
| 4,451,777 | 5/1984 | Gyugyi | 323/210 |
| 4,513,240 | 4/1985 | Putman | 323/210 |
| 4,567,423 | 1/1986 | Dobsa et al. | 307/102 |
| 4,607,217 | 8/1986 | Bhargava | 323/210 |
| 4,695,741 | 9/1987 | Takeda | 307/643 |
| 4,701,689 | 10/1987 | Yuan et al. | 322/19 |
| 4,719,554 | 1/1988 | Bertschi | 363/51 |
| 4,724,333 | 2/1988 | Hedin | 307/105 |
| 4,733,340 | 3/1988 | Mase et al. | 363/35 |
| 4,808,843 | 2/1989 | Hedin | 322/58 |
| 4,825,270 | 4/1989 | Satou et al. | 357/38 |
| 4,843,513 | 6/1989 | Edris | 361/58 |
| 4,855,664 | 8/1989 | Lane | 322/19 |
| 4,888,676 | 12/1989 | Zürcher | 363/58 |
| 4,999,565 | 3/1991 | Nilsson | 323/209 |
| 5,006,784 | 4/1991 | Sonntagbauer | 323/343 |
| 5,032,738 | 7/1991 | Vithayathil | 307/112 |

OTHER PUBLICATIONS

Christl, et al., "Advanced Series Compensation with Variable Impedance," presented at EPRI FACTS Workshop, Cincinnati, Ohio, Nov. 14, 1990.

P. Wood, et al., "Study of Improved Load-Tap Changing for Transformers and Phase-Angle Regulators," EPRI Report No. EL-6079, Nov., 1988.

Hingorani et al., "Prototype NGH Subsynchronous Resonance Damping Scheme Part I—Field Installation and Operating Experience," *IEEE Transactions on Power Systems* PWRS-2, No. 4:1034–1039 (Nov. 1987).

*Primary Examiner*—Steven L. Stephan
*Assistant Examiner*—J. Sterrett
*Attorney, Agent, or Firm*—Klarquist, Sparkman, Campbell, Leigh & Whinston

[57] ABSTRACT

A subsynchronous resonance mitigation system, including a method and apparatus, for damping undesirable subsynchronous resonance oscillations in a generator, which, if left unchecked, may damage the shafts of a turbine-generator set. A remote coupling apparatus, such as a thyristor controlled series capacitor (TCSC) system, a sourced inverter device, or a static phase shifter, is coupled to the generator by a transmission line. In response to a firing command, the coupling apparatus introduces subsynchronous resonance mitigating currents into the transmission line. Sensors monitor power line parameters and/or the generator speed, and in response thereto, a higher-level controller generates a voltage command. A vernier controller responds to the monitored power line parameters and the voltage command to provide the firing command to the coupling apparatus.

44 Claims, 14 Drawing Sheets

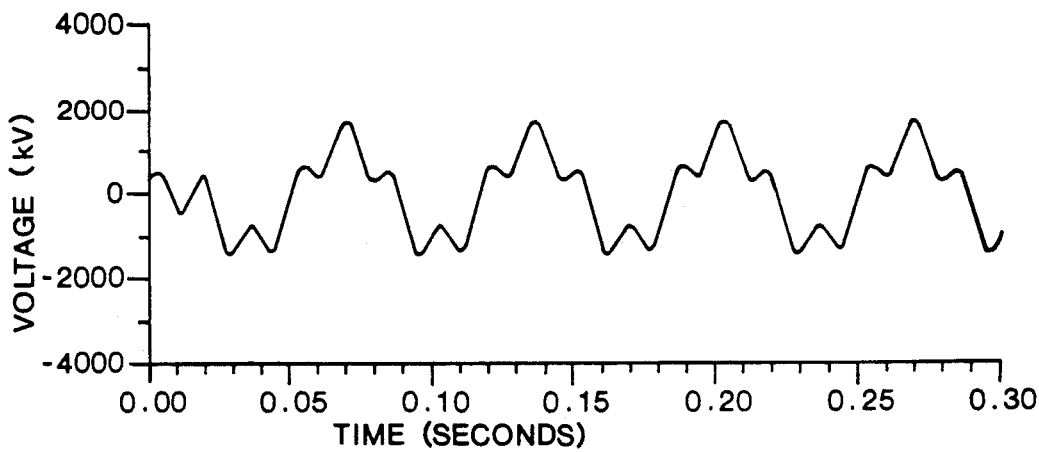
FIG. 7A PRIOR ART — CAPACITOR VOLTAGE
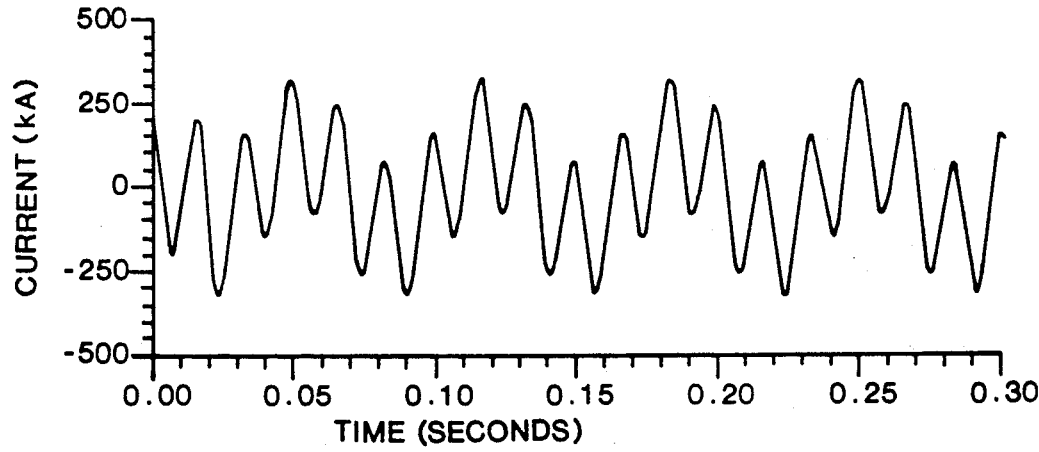
FIG. 7B PRIOR ART — LINE CURRENT

VERNIER CONTROL SYSTEM FOR SUBSYNCHRONOUS RESONANCE MITIGATION

BACKGROUND OF THE INVENTION

This is a continuation-in-part application of the pending patent application Ser. No. 07/806,768, filed on Dec. 13, 1991, and a continuation-in-part application of the pending patent application Ser. No. 07/742,859, filed on Aug. 8, 1991 now U.S. Pat. No. 5,166,597 with each application having the same assignee and one co-inventor in common with each other copending application.

The present invention relates generally to a vernier control system for remotely damping and mitigating subsynchronous resonance at a generator, using a thyristor controlled series capacitor, a static phase shifter, or an inverter device with a coupling transformer, in series with a substantially inductive transmission line. More particularly, the present invention relates to a firing control system, including a method and an apparatus, for secure vernier operation of a thyristor controlled series capacitor system, a static phase shifter, or the inverter device, such as may be used in an alternating current (AC) power distribution system for damping subsynchronous oscillations and direct current (DC) offset.

Left unchecked, subsynchronous resonance oscillations produce damaging torsional oscillations on the shafts of turbine-generator units supplying power to the distribution system. In the past, subsynchronous oscillations have caused extensive damage to the shafts of turbine-generator units, requiring extended periods of down time for repair, resulting in a loss of power generation capacity. Consumers pay the cost of repair through higher utility power bills. Also, consumers ultimately bear the financial burden of purchasing replacement power, usually at a premium, from other utilities to replace the power normally produced by the unit undergoing repair.

Other systems have been proposed for damping subsynchronous oscillations and DC offset in power transmission systems. For example, U.S. Pat. No. 4,292,545 to Hingorani discloses a thyristor controlled capacitor in series with a transmission line. Hingorani's system uses a thyristor valve firing at a fixed time after a zero-crossing of the capacitor voltage. This system uses a resistor for thyristor switching to add damping to the subsynchronous electrical oscillations. This same resistor and commutation strategy also dampens the torsional electro-mechanical oscillations of a turbine-generator set connected to the system, but this dampening is only partially accomplished, and then with some uncertainty.

In U.S. Pat. No. 4,434,376 to Hingorani, which is a divisional of the Hingorani '545 patent, this concept is extended to have firing at a variable time after a capacitor voltage zero-crossing. In the Hingorani '376 patent, the firing time is adjusted relatively slowly, based upon a measurement of the frequency of the AC power system network voltage or current. In U.S. Pat. No. 4,355,241 also to Hingorani, overload protection is added by also triggering the thyristor valve in response to an over-voltage across a series reactance. This series reactance comprises a plurality of tuned circuits, each of which may be tuned to a separate undesirable subsynchronous frequency of the power system so the normal system frequency is unimpeded.

One serious drawback to the systems proposed by Hingorani in his '545, '376, and '241 patents (hereinafter and collectively referred to as "Hingorani") is that Hingorani requires several firings of the thyristor valves before the series capacitor voltage finally creeps-up to the desired level. Furthermore, after reaching the desired level, the Hingorani system typically overshoots the desired value. Other disadvantages of the Hingorani system are discussed further below. The Hingorani system was reduced to practice with an inductor and damping resistor in series for thyristor switching. This Hingorani system was equipped with a variable control policy having a switching time based on the level of subsynchronous distortion of the capacitor voltage. This implementation of the Hingorani system is described in the article by N. G. Hingorani, et al., entitled "Prototype NGH Subsynchronous Resonance Damping Scheme, Part I—Field Installation and Operating Experience," *IEEE Transactions on Power Systems*, Vol. PWRS-2, No. 4 (November, 1987).

In a 1988 paper by J. J. Vithayathil, et al. entitled, "Case Studies of Conventional and Novel Methods of Reactive Power Control on an AC Transmission System," it was suggested that by using partial conduction of an inductor across a series capacitor, the effective compensation level of the series capacitor could be varied substantially. Vithayathil also suggested that this system could be beneficial for stabilizing power systems. However, Vithayathil's inductor is controlled in the same way that a thyristor controlled reactor of a static VAR compensator is controlled, which is essentially the same as the Hingorani system. That is, both the Hingorani and Vithayathil systems are based on timing signals derived from the zero-crossing times of the capacitor voltage. The Vithayathil scheme also involves determining a firing time by assuming a purely sinusoidal voltage across the capacitor which, in actuality, is not a pure sinusoidal waveform.

In a 1990 paper by N. Christl, et al. entitled "Advanced Series Compensation With Variable Impedance," a "thyristor controller" mode is described which is similar to the "vernier" mode discussed further below. Christl shows several waveforms resulting from using the firing delay angle as the controlling variable.

Each of these earlier systems of Hingorani, Vithayathil, and Christl merely discloses a thyristor controlled series capacitor system where the firing of the thyristor valves is based on a time determined from either the actual or the synthesized time of zero-crossings of the capacitor voltage. These systems are incapable of quickly and precisely damping subsynchronous oscillations and DC offsets in a power transmission system. Moreover, each of these firing systems is slow to respond.

Another related device is disclosed in U.S. Pat. No. 4,384,246 to Larsen et al. to address this problem. The Larsen et al. system places a voltage source, through a reactance, in series with the neutral end of a secondary winding of a generator step-up transformer. The Larsen et al. system employs a pair of thyristors to apply the voltage source to the transformer winding. A control circuit fires the thyristors to dampen subsynchronous resonance currents and to prevent torsional mode vibrations from occurring within the turbine-generator set.

In U.S. Pat. No. 3,813,593 to Tice et al a method for reducing turbine-generator shaft torques is disclosed. In this system, a plural section power filter is serially connected in a power transmission system power line. The filter is connected the low voltage ends of each winding on the transmission system power line side of a step-up transformer. The filter is also connected to a common neutral in each leg of the wye secondary of the generator step-up transformer. The filter is tuned to provide a low impedance for current at the power system frequency. This filter is also tuned to present a high impedance to current at subsynchronous frequencies. This impedance stress is provided in a ratio proportional to the amount of stress expected to be caused to the turbine-generator connecting shafts by the interaction of subsynchronous frequency currents with the generator magnetic flux.

None of these earlier systems provides a secure means of controlling a thyristor controlled series capacitor where the actual capacitor voltage responds promptly to a command signal. Furthermore, these earlier systems are incapable of precisely controlling the duty on the thyristors. Additionally, these earlier systems are susceptible to drifting of the capacitor voltage away from a desired setting due to disturbances in the transmission line current.

Thus, a need exists for an improved firing control system for secure vernier operation of a thyristor controlled series capacitor, a static phase shifter, or an inverter device, used to remotely damp subsynchronous torsional oscillations of a turbine-generator set supplying power to a transmission system, as well as to damp DC offset, which is directed toward overcoming, and not susceptible to, the above limitations and disadvantages.

SUMMARY OF THE INVENTION

A firing control scheme, including a method and apparatus, for secure vernier operation of a thyristor controlled series capacitor (TCSC) in series with a transmission line uses phase control firing based on monitored capacitor voltage and line current. The TCSC system has a thyristor switched inductive commutating circuit in parallel with the series capacitor. Vernier operation of the TCSC system is provided by predicting an upcoming firing angle for switching the commutating circuit to conduct a thyristor bypass current pulse therethrough. The current pulse causes an alternating offset component of voltage to appear across the series capacitor, in addition to the normal voltage component. Each current pulse changes the capacitor voltage proportionally to the integrated value of the current pulse. The TCSC system promptly responds to an offset command from a higher-level controller, precisely controls the duty on the bypass thyristors to minimize thyristor damage, and prevents drift of the capacitor voltage away from a desired setting during line current disturbances.

According to another aspect of the present invention, a subsynchronous resonance mitigation system, including a method and an apparatus, are provided for damping subsynchronous resonance oscillations occurring in a generator from a transmission line coupled to the generator. The system includes a coupling apparatus which may be in series with the transmission line at a location remote from the generator. The coupling apparatus is responsive to a firing command and introduces subsynchronous resonance mitigating currents into the transmission line. Several sensors are provided for monitoring power line parameters, and in some embodiments, generator speed. The system includes a higher-level controller for generating a voltage command in response to the generator speed which may be determined from the monitored power line parameters. A controller responds to the monitored power line parameters and the voltage command to provide the firing command to the coupling apparatus.

An overall object of the present invention is to provide an improved method for use in an AC transmission line to remotely damp subsynchronous oscillations and undesirable DC offset occurring therein.

A further object of the present invention is to provide an improved higher-level controller determining a voltage command from the generator velocity to provide appropriate damping of the subsynchronous resonance oscillations from a location remote from the generator.

An additional object of the present invention is to provide an improved thyristor controlled series capacitor system, and an improved vernier controller for use with such a system.

Another object of the present invention is to provide a secure means of controlling a thyristor controlled series capacitor system which responds promptly to a firing command, minimizes damage to the thyristors, and maintains the capacitor voltage at a predetermined level despite power system disturbances.

The present invention relates the above features and objects individually as well as collectively. These and other objects, features and advantages of the present invention will become apparent to those skilled in the art from the following description and drawings.

BRIEF DESCRIPTION OF THE DRAWINGS

FIGS. 6A–9E show the responses of several systems and control variables when subjected to a small system disturbance;

FIGS. 6A, 6B and 6C are graphs for vernier operation of the TCSC system of FIG. 1, with FIGS. 6A–6C showing waveforms of the capacitor voltage, the line current, and the thyristor current, respectively;

FIGS. 7A and 7B are graphs for a prior art system having no thyristor control, such as a conventional series capacitor application, with FIGS. 7A and 7B showing waveforms of the capacitor voltage, and the line current, respectively;

FIGS. 9A, 9B, 9C, 9D and 9E are graphs for several of the internally controlled variables for the vernier controller of FIGS. 1 and 2, with FIGS. 9A–9D showing waveforms of the variables ALOP, ALMAG, ASPM, and VOIM, respectively, and FIG. 9E showing a waveform of BETAF, which corresponds to BETAP when BETAC is zero;

DETAILED DESCRIPTION OF A PREFERRED EMBODIMENT

Figure 1:
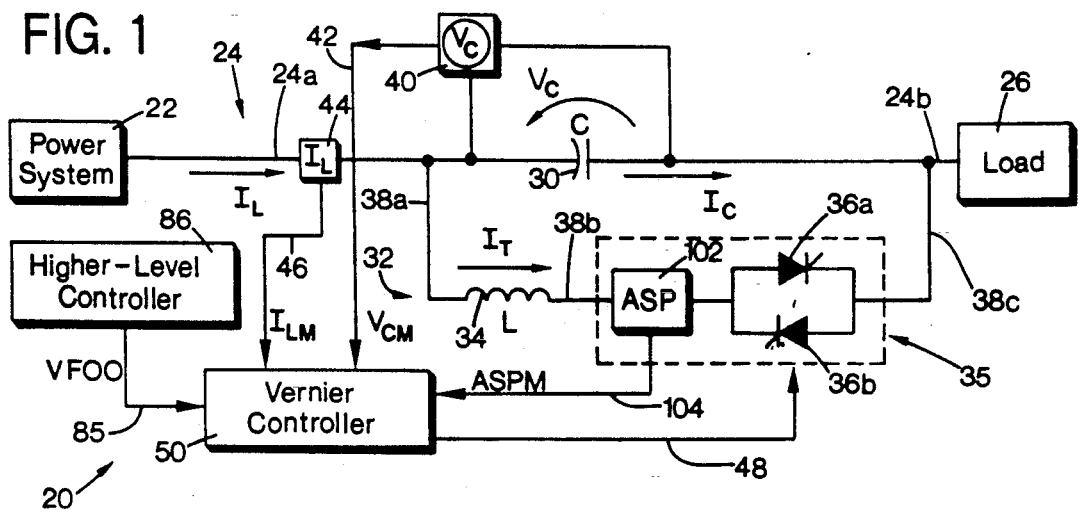
FIG. 1 is a single line schematic diagram of one form of a subsynchronous resonance mitigation system comprising a thyristor controlled series capacitor (TCSC) system of the present invention, shown in series with a transmission line.

FIG. 1 illustrates an embodiment of a subsynchronous resonance (SSR) mitigation system or apparatus, such as a thyristor controlled series capacitor (TCSC) system 20 constructed in accordance with the present invention for damping undesirable subsynchronous oscillations and undesirable DC offset occurring in a power system or grid 22. The power system 22 has a transmission line 24 with segments 24a and 24b coupling the TCSC system 20 in series with the power system 22 and with a load 26, respectively. A line current $I_L$ represents the direction of power flow from the power system 22 to the load 26.

The TCSC system 20 has coupling apparatus comprising a capacitor ("C") 30 in series with transmission line 24 and an inductive commutating circuit 32 in parallel with the capacitor 30. The capacitor 30 may be a plurality of discrete capacitor units joined as a capacitor bank having a known capacitive reactance $X_C$. The commutating circuit 32 includes an inductive component, such as an inductor ("L") 34, and a thyristor switch or valve 35 in series with the inductor 34. The thyristor valve 35 has two antiparallel diodes 36a and 36b, hereinafter referred to collectively as thyristors 36 unless otherwise noted. The commutating circuit 32 has conductor segments 38a, 38b and 38c coupling the inductor 34 and thyristor valve 35 with the capacitor 30 and transmission line 24 as shown. In FIG. 1 the following variables are shown: $I_L$ for the line current through transmission line 24, $V_C$ for the actual voltage across capacitor 30, $I_C$ for the current through capacitor 30, and $I_T$ for the bypass thyristor current pulse flowing through the inductor 34 and the thyristor valve 35.

The TCSC system 20 may have at least one transmission line sensor monitoring a parameter of the power flowing through the transmission line, such as the voltage, current, power factor, power angle, real or reactive power, etc. The illustrated TCSC system 20 has a voltage monitor or sensor, such as a voltmeter 40, monitoring the voltage across the series capacitor 30. The voltage sensor 40 produces a measured capacitor voltage $V_{CM}$ signal 42 in response to the monitored actual capacitor voltage $V_C$. The illustrated TCSC system 20 also has a line current monitor or sensor, such as an ammeter 44, monitors the line current $I_L$ flowing through the transmission line segment 24a. The line current sensor 44 produces a measured line current $I_{LM}$ signal 46 in response to the monitored line current $I_L$. The capacitor voltage $V_{CM}$ and line current $I_{LM}$ are preferably measured each half cycle.

Figure 2:
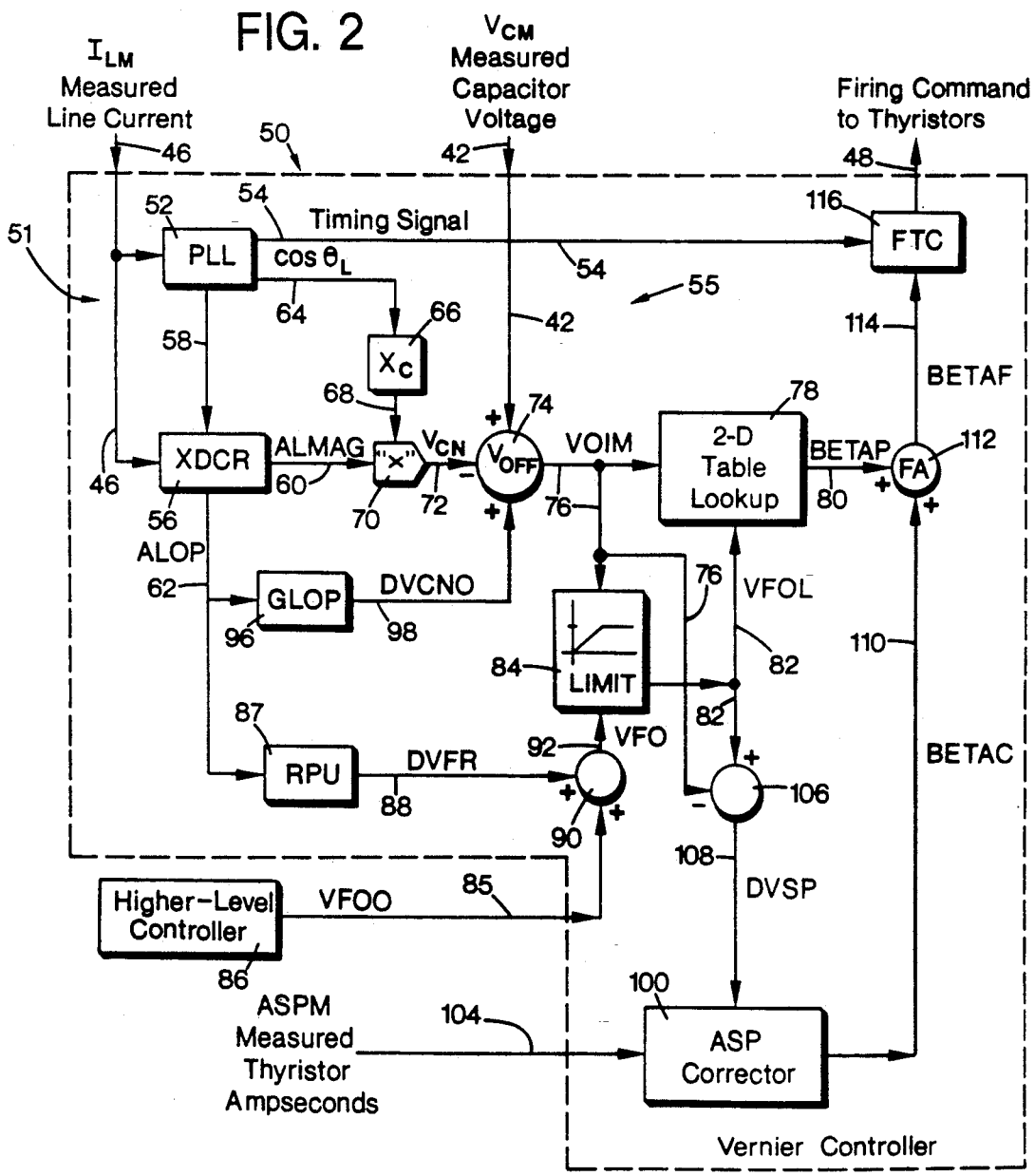
FIG. 2 is a block diagram of one form of a vernier controller of the present invention for controlling the TCSC system of FIG. 1.

The commutating circuit 32 conducts a thyristor current pulse therethrough when the bypass thyristor switch 35 fires to enter a conducting state in response to a firing command or firing pulse signal 48. This firing, preferably ahead of a capacitor voltage zero-crossing, produces an alternating offset voltage component across the series capacitor 30. As shown in FIG. 2, the TCSC system 20 includes control means, such as a firing time controller or vernier controller 50. The controller 50 has firing prediction means, such as a firing predictor 51, for receiving the measured line current $I_{LM}$ signal 46, the measured capacitor voltage $V_{CM}$ signal 42, and other signals as described further below, and for predicting therefrom an upcoming firing time at which the firing pulse signal 48 is provided by the controller 50 to the thyristor switch 35. From the description herein, it is apparent that the vernier controller 50 may be implemented primarily in hardware, primarily in software, or various equivalent combinations of hardware and software known by those skilled in the art.

Figure 3A:
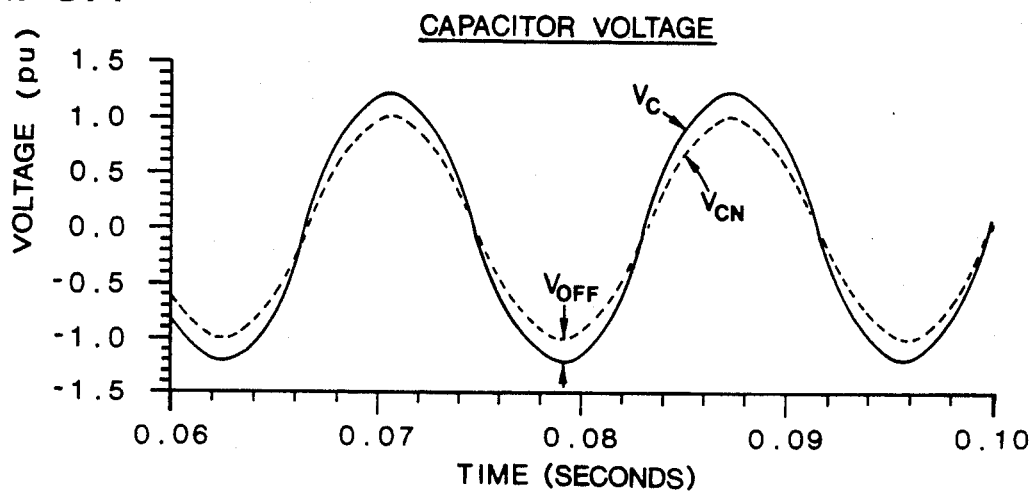
FIGS. 3A, 3B and 3C are graphs of vernier operation of the TCSC system of FIG. 1, with FIG. 3A illustrating the normal and actual capacitor voltages, FIG. 3B showing the line and thyristor currents, and FIG. 3C illustrating the alternating offset voltage component.
Figure 3B:
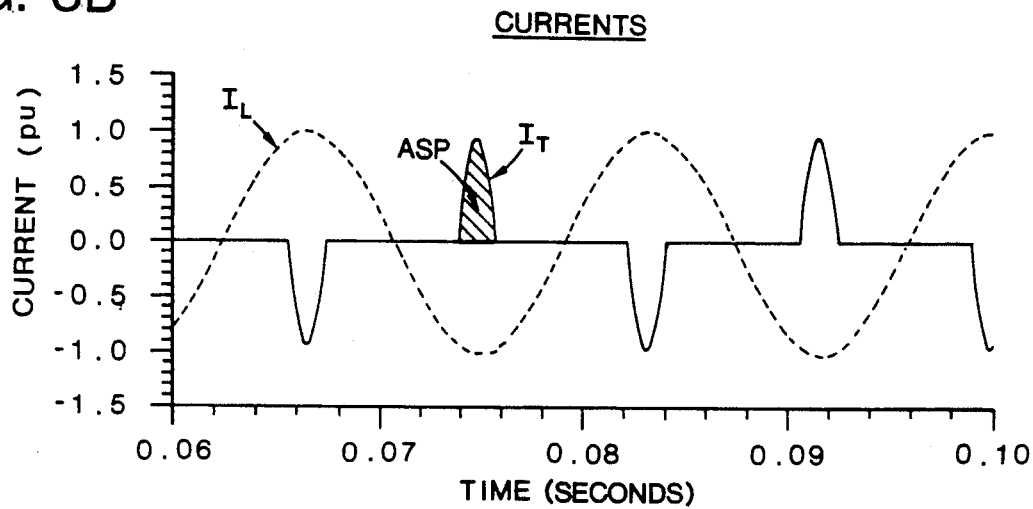
Figure 3C:
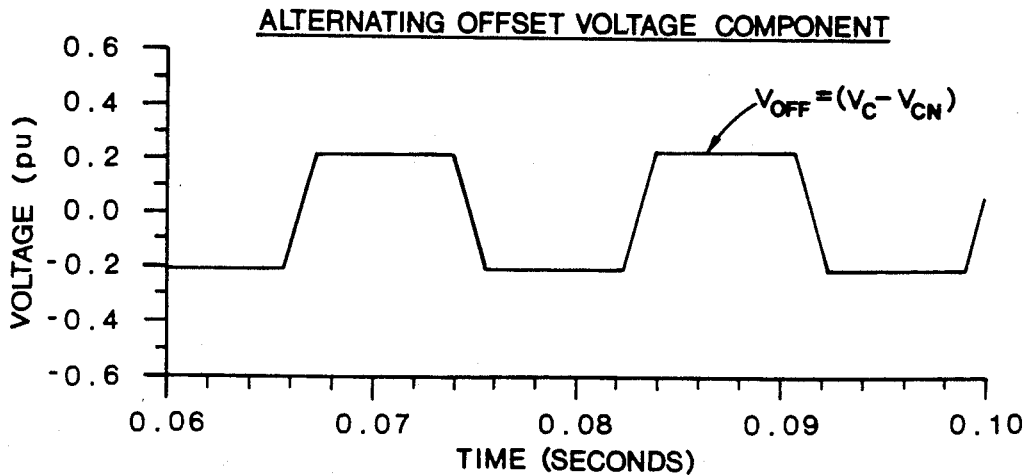

Before describing the operation of the vernier controller 50 in detail, a brief overview of the operation of the TCSC system 20 will be given with reference to the wave shapes of FIGS. 3A–3C. These graphs illustrate the per unit (pu) values of the variables for steady-state operation with 20% vernier control of the capacitor voltage, which is provided in a manner described further below. In FIG. 3A, the actual capacitor voltage $V_C$ includes a normal capacitor voltage component $V_{CN}$ which represents the capacitor voltage that would exist without thyristor firing and with a purely sinusoidal line current $I_L$. The difference between the capacitor voltage $V_C$ and the normal capacitor voltage component $V_{CN}$ is provided by an offset voltage component $V_{OFF}$ shown in FIG. 3C. Each pulse of thyristor current $I_T$ causes a change in the actual capacitor voltage $V_C$ that is proportional to an integrated value of the current $I_T$ in units of ampseconds (ASP), corresponding to the area labeled "ASP" under the $I_T$ current pulses, as shown in FIG. 3B. The following discussion of the operation of the vernier controller 50 also discloses a method controlling the TCSC system 20, and a method of inducing a predetermined voltage offset into the capacitor 30.

Referring again to FIG. 2, the controller 50 is illustrated as a primarily microprocessor based software implementation. The controller 50 has synchronizing means which may comprise a synchronizer or phase locked loop means, such as a phase-locked loop device (PLL) 52. The PLL 52 uses the monitored line current $I_{LM}$ signal 46 to create a first timing reference signal 54 which is in synchronism with the line current $I_L$. The PLL 52 may be implemented in a variety of structurally equivalent hardware and software forms known by those skilled in the art.

The firing predictor 51 includes TCSC parameter prediction means, such as a TCSC parameter predictor, for predicting the value of an upcoming variable or parameter of interest for the power flowing through the TCSC system 20. In the illustrated embodiment, the TCSC parameter prediction means comprises capacitor voltage predicting means, such as a capacitor voltage ($V_C$) predictor 55, for predicting the value of an upcoming initial capacitor offset voltage (VOIM) from the measured line current $I_{LM}$ and the measured capacitor voltage $V_{CM}$. The $V_C$ predictor 55 includes transduction means, such as a transduction device devised or programmed to perform a transduction method or routine (XDCR) 56. The XDCR 56 receives the $I_{LM}$ signal 46 and a second timing signal 58 generated by the PLL 52. In the illustrated embodiment, the second timing signal 58 is the same as signal 54, although in some applications it may be advantageous to have different values for timing signals 54 and 58. From the timing signal 58 and the $I_{LM}$ signal 46, the XDCR 56 determines the magnitude of the transduced line current (ALMAG) and provides a corresponding transduced line current magnitude signal 60. The XDCR 56 also determines an offset component of the line current (ALOP), and provides a corresponding measured line current offset component signal 62. The XDCR 56 may be implemented in a variety of structurally equivalent hardware and software forms known by those skilled in the art.

A further portion of the $V_C$ predictor 55 is provided by a portion of the PLL 52 which determines a sinusoidal cos $\phi_L$ function and provides a corresponding cos $\phi_L$ signal 64 in response thereto. The cos $\phi_L$ function represents an instantaneous point on the line current $I_L$ waveform corresponding to the timing signal 54. The angle $\phi_L$ represents the angle of the AC line current $I_L$ being predicted or estimated when the timing signal 54 is emitted from the PLL 52. The known value of the capacitive reactance $X_C$ of capacitor 30 is multiplied by the cos $\phi_L$ function signal 64 by factoring means, such as a capacitive reactance factoring routine or device, illustrated as an $X_C$ gain block 66, to provide a factored cos $\phi_L$ function ($X_C$ cos $\phi_L$) signal 68.

The $V_C$ predictor 55 also has multiplication means, such as a multiplication routine, shown as a multiplication function block 70. The multiplication function block 70 receives and multiplies together the ALMAG signal 60 and the ($X_C$ cos $\phi_L$) signal 68 to provide a predicted value of the normal capacitor voltage $V_{CN}$. The predicted normal capacitor voltage $V_{CN}$ is the capacitor voltage which is expected without any firing of the thyristor valve 35 (see FIG. 3A). For example, during steady state conditions, with the ALMAG signal 60 and the capacitive reactance $X_C$ each at a constant value, $V_{CN}$ is a sinusoidal waveform. The multiplier block 70 provides a $V_{CN}$ signal 72 corresponding to this predicted $V_{CN}$ value. The portion of the $V_C$ predictor 55 thus far described, may be referred to collectively as normal capacitor voltage determining device for determining $V_{CN}$ from the monitored line current $I_{LM}$.

The $V_C$ predictor 55 also has comparing means, such as a voltage offset $V_{OFF}$ comparator 74. The $V_{OFF}$ comparator 74 determines an offset voltage component $V_{OFF}$ of the capacitor voltage $V_C$ from the difference between the measured capacitor voltage $V_{CM}$ signal 42 and the predicted normal capacitor voltage $V_{CN}$ signal 72 (see FIGS. 3A and 3C). The comparator 74 expresses this difference by producing a measured initial offset (VOIM) signal 76, which is also the output of $V_C$ predictor 55.

Thus, the $V_C$ predictor 55 predicts the initial capacitor offset voltage VOIM from the monitored line current $I_{LM}$ received from the current sensor 44, and from the monitored capacitor voltage $V_{CM}$ received from the voltage sensor 40. The illustrated $V_C$ predictor 55 includes the portion of the PLL 52 which provides the cos $\phi_L$ signal 64 and the timing signal 58, the $X_C$ gain block 66, multiplier block 70, the XDCR 56, and the $V_{off}$ comparator 74.

By knowing this offset voltage component $V_{OFF}$ before firing the thyristor valve 35, the required firing angle may be directly determined so the desired capacitor voltage offset $V_{OFF}$ is obtained at the end of the resulting pulse of thyristor current $I_T$ flowing through the thyristor valve 35. The firing angle to provide the desired voltage offset is easily obtained knowing the physical parameters of the TCSC system circuit, which are primarily the capacitance of the capacitor 30, and the inductance L of inductor 34. To accomplish this, the firing predictor 51 has data storage or memory look-up means, such as a 2-D table look-up table circuit or a programmable data storage device 78. The relationship between these parameters may be precalculated and preprogrammed into look-up circuit or program 78. The look-up circuit or program 78 may be a programmed array, registers, latches or other structurally equivalent data storage and retrieval programs and devices known by those skilled in the art. The look-up circuit or program 78 determines a predicted firing angle and provides a predicted firing angle (BETAP) signal 80 from the VOIM signal 76 and a desired final offset (VFOL) signal 82 corresponding to a desired final capacitor voltage offset value VFOL.

This portion of the vernier controller 50 represents a predictive aspect of the controller which advantageously enhances the performance of this system over the earlier systems, including those of Hingorani. This phase controlled thyristor firing scheme, where the thyristor valve 35 is fired at a predicted upcoming time after a normal zero-crossing firing time, advantageously provides vernier control of the TCSC system 20. Vernier operation refers adjusting and controlling the capacitor voltage $V_C$ in a continuous manner over the entire voltage waveform.

The firing predictor 51 has limiting means, such as a limiter 84, for limiting VFOL signal 82 to limit the maximum duty of the thyristors 36. The limited VFOL signal 82 is based on the difference between the VOIM signal 76 and a final offset ordered (VFOO) or voltage command signal 85. The VFOO command signal 85 corresponds to an ordered offset for the capacitor voltage $V_C$ which may be generated by a higher-level controller 86, one example of which is described further below. The higher-level controller 86 may be provided, for example, by a system dispatcher of the power system 22 to obtain a desired voltage drop across the TCSC system 20. Another example of the higher-level controller 86 is a load control device (not shown) for industrial applications to control the manner in which load 26 appears to the power system 22.

While only one higher-level controller 86 is shown, it is apparent to those skilled in the art that several such higher-level controllers may be used, with their outputs combined by a summing junction (not shown). For example, higher-level controllers may be used to provide modulation control for damping power swings, such as those on the order of 0.2 Hz-2.0 Hz.

Optionally, the VFOO command signal 85 may be modified to enhance the performance of the TCSC system 20 by providing a resistive component behavior for the TCSC system 20 as seen by the transmission line 24 and power system 22. To accomplish this enhancement, the illustrated controller 50 has resistive modeling modulator means, such as a resistive effect (RPU) modulator 87, for modulating the VFOO command signal 85 upon receipt from the higher-level controller 86. In essence, the resistive effect modulator 87 modulates the VFOO command signal 85 in a manner which causes the overall reaction of the TCSC system 20 to resemble a resistor in the transmission line 24.

The RPU modulator 87 receives the ALOP signal 62 and multiplies signal 62 by an RPU gain value which represents the magnitude of the desired resistive effect. In this manner, the resistive effect modulator 87 provides a modulating voltage (DVFR) signal 88. The VFOO command signal 85 and the DVFR signal 88 are added together by summing means, such as a summer circuit or routine 90, to produce a final offset voltage (VFO) signal 92. It is apparent that without the optional DVFR signal 88, the final offset voltage VFO signal 92 would correspond to the ordered final offset voltage VFOO signal 85.

The illustrated limiter 84 limits the VFOL signal 82 to a maximum limit based on the difference between the initial VOIM signal 76 and the final VFO signal 92. This limiting function advantageously provides a desired direct control of the duty imposed on the thyristors 36a and 36b. The thyristor duty is limited because the ampseconds ASP value of a pulse of the thyristor current $I_T$ is directly related to the change in the capacitor voltage $V_C$ over the duration of the pulse (see FIG. 3B). It is apparent that other types of limiting functions may be implemented in particular applications to limit the thyristor duty.

Optionally, the vernier controller 50 may have intra-cycle voltage prediction enhancing means, such as a voltage prediction enhancer (GLOP) 96, for enhancing the prediction of the initial capacitor offset voltage VOIM to predict the value of VOIM at a predetermined intra-cycle time during the thyristor current pulse. The GLOP 96 receives the ALOP signal 62 and multiplies it by a GLOP gain value. The GLOP 96 output is a desired or predicted capacitor voltage (DVCNO) signal 98 which predicts an inter-cycle value for $V_{OFF}$, such as when the thyristor current $I_T$ pulse is a certain way through a cycle, for instance, half way through the cycle. The DVCNO signal 98 is added to the $V_{CN}$ signal 72 and the $V_{CM}$ signal 42 by the $V_{OFF}$ comparator 74. This is possible since the offset component of the current ALOP translates to a change in the offset component of capacitor voltage $V_{OFF}$ over time.

The functions of the vernier controller 50 described above encompass a predictive control for the TCSC system 20 which provides the desired system security. This desired security refers to the prompt response of the actual capacitor voltage $V_C$ to the VFOO command signal 85. This security also refers to the ability of the TCSC system to precisely control the duty on the thyristors 36 to minimize damage to the thyristors. This thyristor duty control is provided by the limiter 84 in the illustrated embodiment. Operational security of the TCSC system 20 is also provided because the voltage $V_C$ across the series capacitor 30 does not drift away from a desired setting due to disturbances in the line current $I_L$ flowing through the TCSC system.

To enhance the long term accuracy for the TCSC system 20, the controller 50 has optional correcting means, such as a thyristor ampseconds (ASP) corrector 100, for correcting the predicted firing angle BETAP 80. The ASP corrector 100 provides a feedback path for the actual ampseconds experienced by the thyristors 36a and 36b. This ampsecond value is measured by thyristor monitoring or sensor means, such as a thyristor ampsecond or ASP monitor 102, for monitoring an ampsecond value of the thyristor current $I_T$ pulse flowing through the commutating circuit 32. The ASP monitor 102 may comprise an ammeter for measuring and integrating the thyristor current $I_T$ to determine a value of the ampseconds and provide a corresponding measured thyristor ampsecond (ASPM) signal 104. The ASPM signal 104 is an optional feedback signal to the vernier controller 50, which may be operated without feedback as an open loop controller.

The controller 50 has comparing means, such as a comparator 106, for determining a predicted voltage change (DVSP) signal 108 by subtracting the initial VOIM signal 76 from the final VFOL signal 82. The DVSP signal 108 is supplied to the ASP corrector 100. The ASP corrector 100 compares the ASPM signal 104 with the DVSP signal 108 to establish an error signal within the ASP corrector. The ASP corrector integrates this error signal to provide an output of a corrector firing angle (BETAC) signal 110. The controller 50 has summing means, such as a firing angle summer circuit or routine 112, which adds the corrector BETAC signal 110 to the predicted firing angle BETAP signal 80 to obtain a final firing angle command (BETAF) signal 114.

The controller 50 has firing timing means, such as a firing time computer (FTC) 116, for generating the firing command 48 at the upcoming time predicted by the firing predictor 51. The FTC 116 translates the final BETAF signal 114 into the firing pulse signal 48 at the appropriate times in response to the timing signal 54 received from the PLL 52. Upon receiving the firing command 48, the thyristor valve 35 fires to enter a conducting state from a nonconducting state so pulses of thyristor current $I_T$ can flow through the commutating circuit 32.

Performance

Figure 4A:
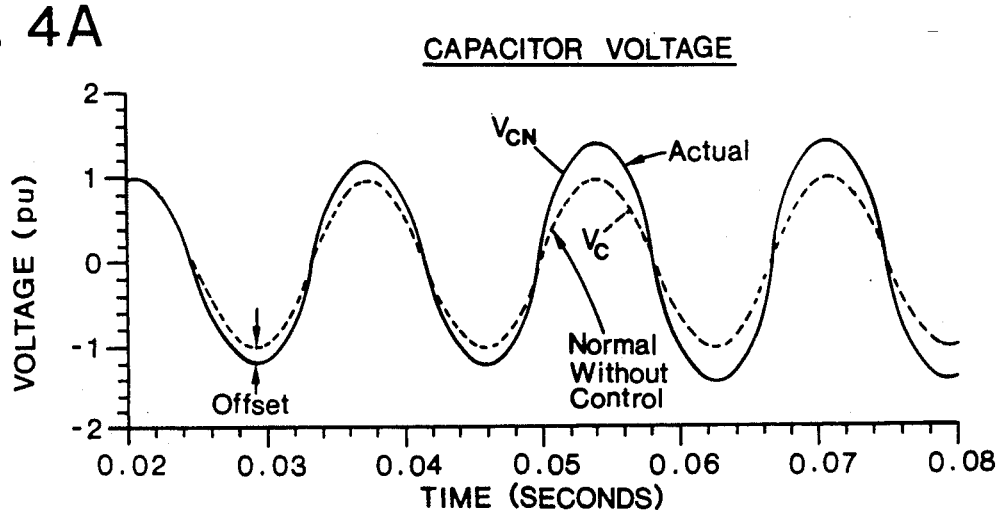
FIGS. 4A, 4B and 4C are graphs of vernier operation of the TCSC system of FIG. 1 acting in response to a step in the commanded capacitor voltage, with FIG. 4A showing the normal and actual capacitor voltage, FIG. 4B showing the thyristor valve current, and FIG. 4C showing the offset order and response.
Figure 4B:
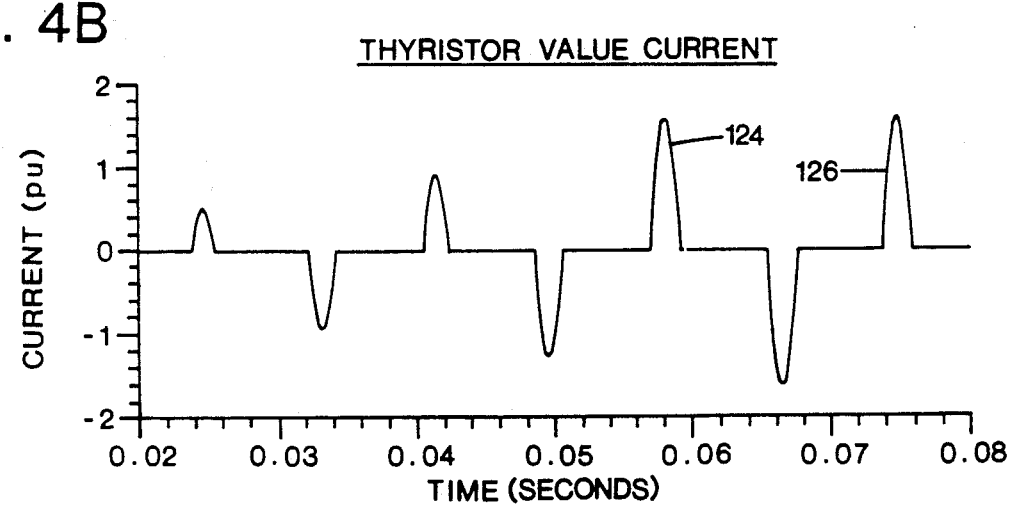
Figure 4C:
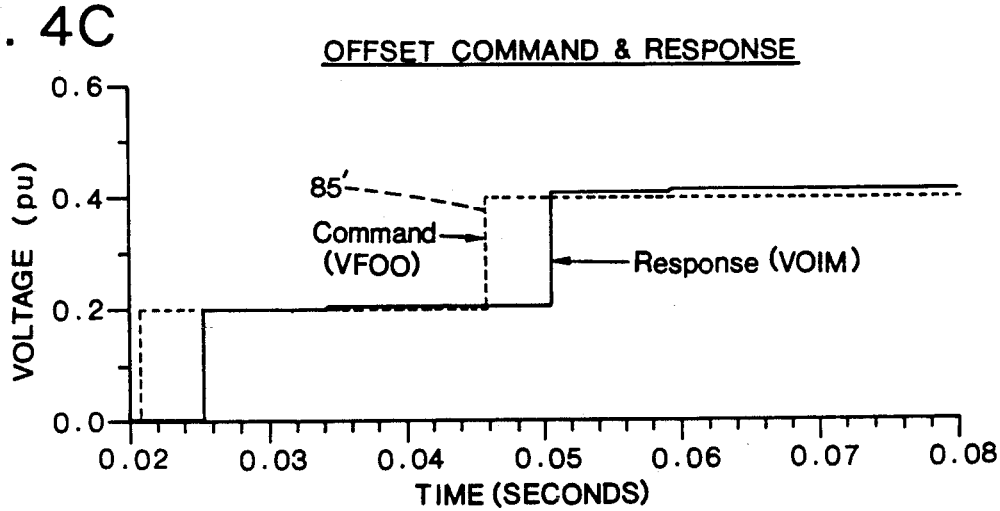
Figure 5A:
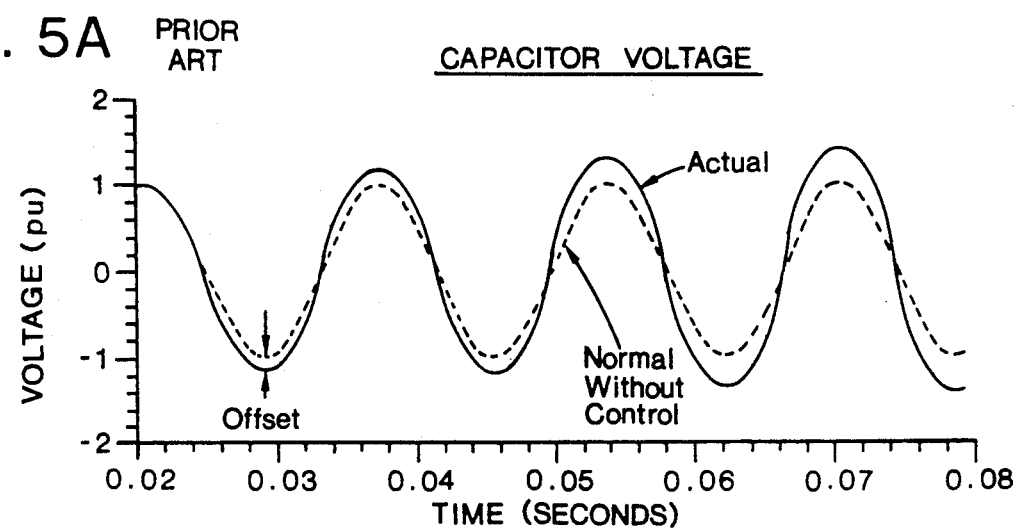
FIGS. 5A, 5B and 5C are graphs of the responses of the prior art Hingorani system acting in response to the same type of step in ordered or commanded capacitor voltage as that of the graphs for FIGS. 4A, 4B and 4C, respectively.
Figure 5B:
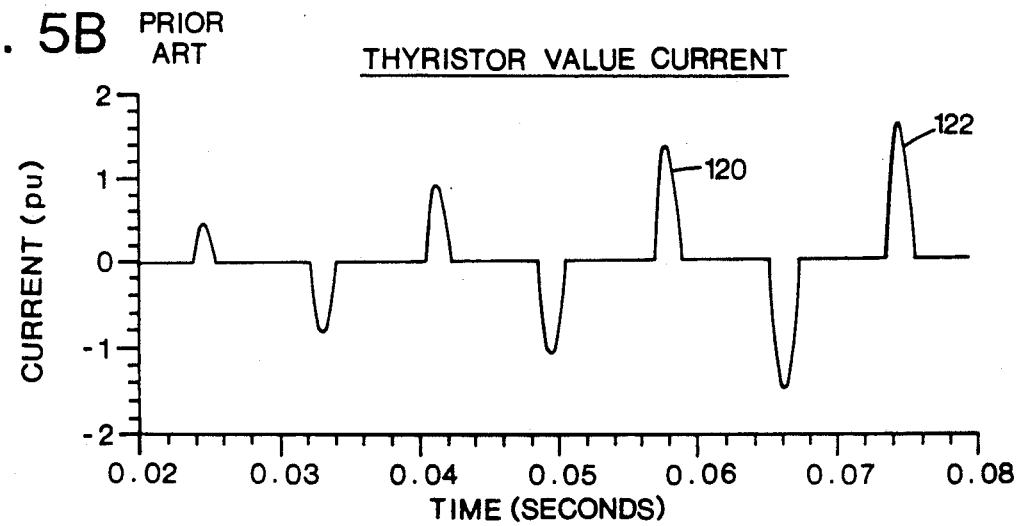
Figure 5C:
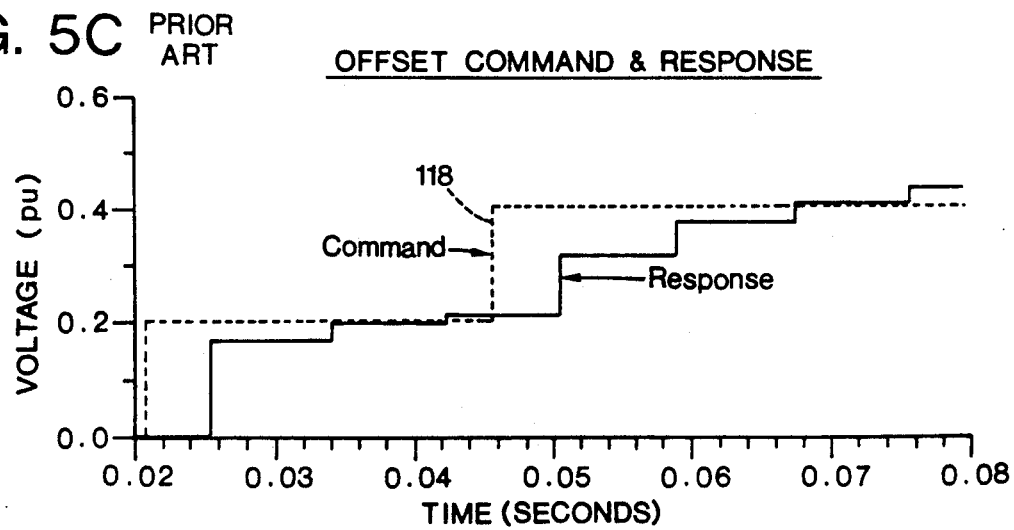

The performance of the TCSC system 20, as shown in FIGS. 4A-4C, is clearly a vast improvement over the operation of the earlier Hingorani system, shown in FIGS. 5A-5C. The wave shapes of FIGS. 4A-4C and 5A-5C show the responses of the system described herein and the Hingorani system, respectively, when subjected to a 0.2 pu (per unit) step change in the ordered capacitor offset voltage.

FIGS. 5A-5C show the Hingorani system slowly creeping upward to the desired level after several valve firings, and then overshooting this desired value. For example, a command 118 to increase the offset voltage is given shortly before 0.046 seconds (see FIG. 5C). As best shown in FIGS. 5B, with a desired thyristor current pulse amplitude of 1.6 pu, a first positive pulse 120 occurring after the command 118 undershoots the desired value, and thereafter, a second positive pulse 122 overshoots this value.

In contrast, the TCSC system 20 provides a prompt response to the VFOO command signal 85', shown in FIG. 4C. For example, the thyristor current pulse amplitude moves promptly to the desired level of 1.6 pu, as shown in FIG. 4B by both positive pulses 124 and 126. Thus, the TCSC system 20 achieves the desired capacitor voltage $V_C$ immediately after the very next valve firing occurring after in the TCSC system 20.

The example of FIGS. 4A–4C illustrates the attainment of the first security objective, namely a fast and accurate response to the VFOO command signal 85 received from the higher-level controller 86. Moreover, these waveforms show that the second security objective of controlling thyristor duty is also satisfied. The thyristor duty is directly related to the change in capacitor voltage on each firing. Thus, precise control of the capacitor voltage also provides precise control of the thyristor duty as well.

The third security objective achieved by the TCSC system 20 relates to the response of the DC offsets in the line current $I_L$. In the absence of any thyristor control, the average capacitor voltage drifts away from the desired zero point if the line current $I_L$ is offset, for example by a system disturbance. This drifting disadvantageously leads to subsynchronous resonance conditions when considering the entire power system circuit comprising an inductive transmission line coupled with a series capacitor. The inductance of the transmission line interacts with the series capacitance to create a series resonant circuit, having a natural frequency which is typically substantially less than the synchronous operating frequency of the AC power system (i.e., 60 Hz for North America). Thus, this natural resonant frequency is referred to as a "subsynchronous frequency."

Figure 6A:
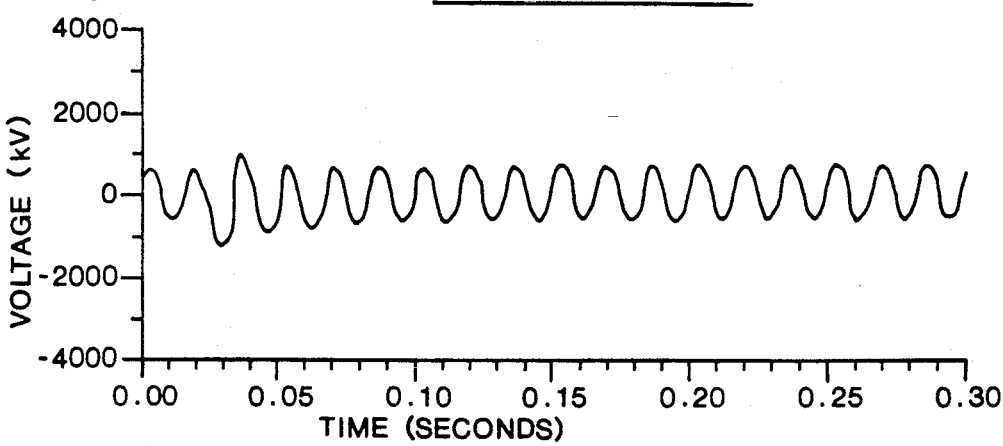
Figure 6B:
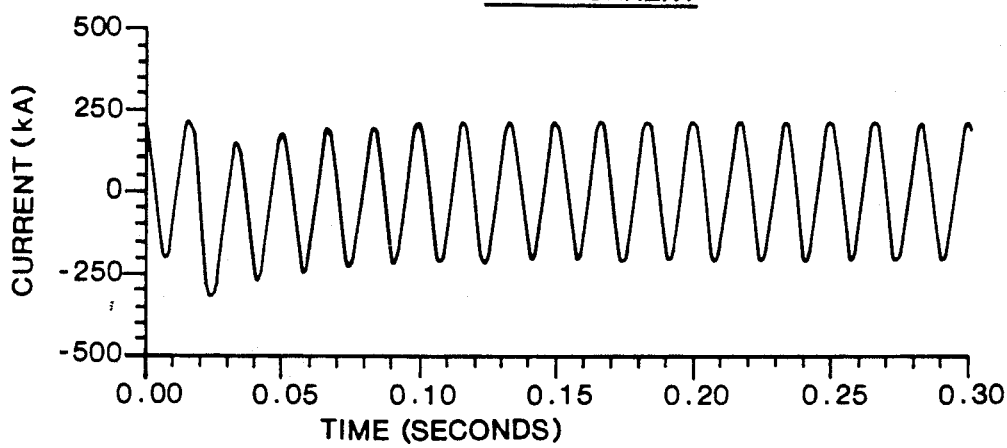
Figure 6C:
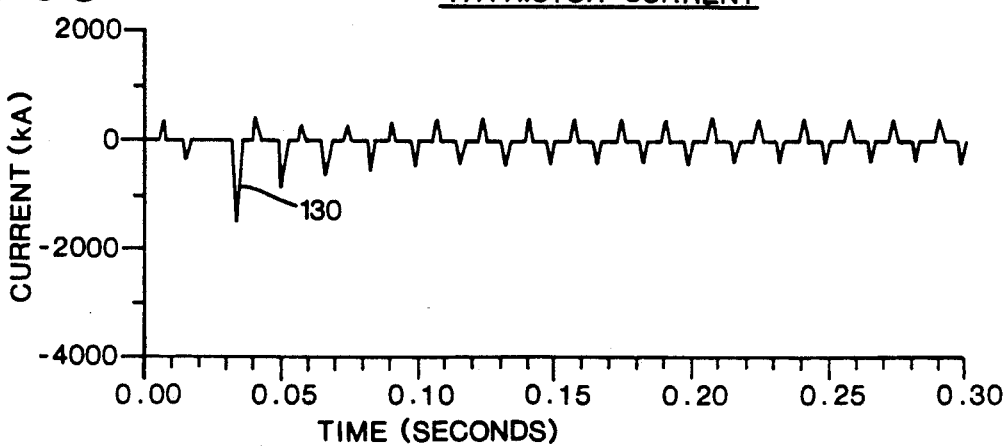

FIGS. 6A–6C illustrate the performance of the TCSC system 20 under subsynchronous resonance conditions when the inductance of the transmission line 24 and the selected capacitance of the series capacitor 30 resonate at 15 Hz. A small disturbance is introduced in the beginning of this simulation around time 0.02 seconds to cause a temporary deviation from steady-state operation. FIG. 6B shows the decay of the DC offset component in the line current $I_L$ back to the 60 Hz zero. The waveforms in FIGS. 6A–6C show recovery back to normal conditions in a smooth and rapid manner using the TCSC system 20.

FIGS. 7A and 7B illustrate the response of a conventional series capacitor compensation system having no thyristor control. In contrast with the smooth recovery of the TCSC system 20 in FIGS. 6A–6C, FIGS. 7A and 7B illustrate the nature of response of this circuit if no thyristor control were provided at all. The capacitor voltage waveform of FIG. 7A, and the line current waveform of FIG. 7B, each display a clear 15 Hz component in the waveforms after the initiation of the disturbance. Furthermore, the waveforms of FIGS. 7A and 7B show only a very small damping of the disturbance.

Figure 8A:
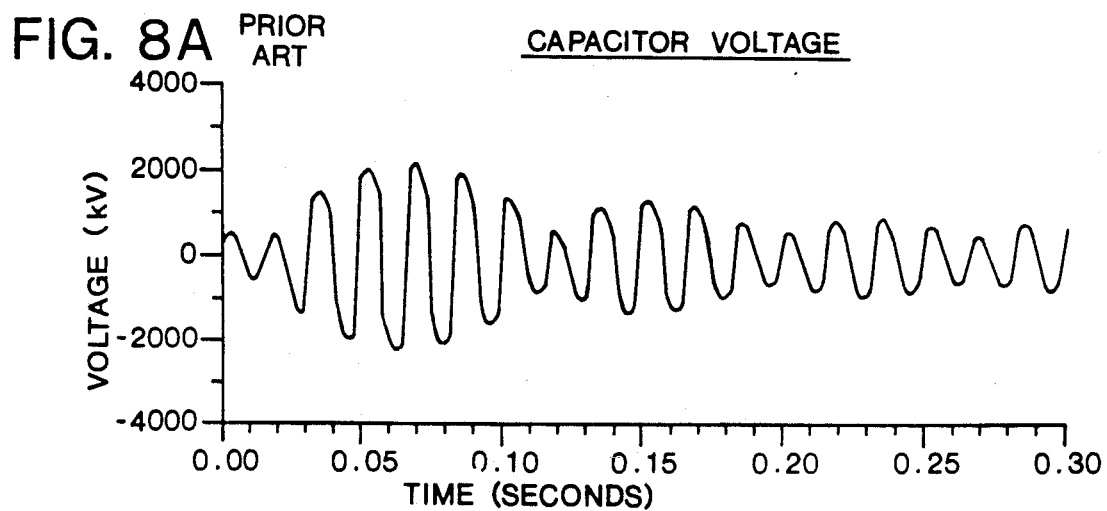
FIGS. 8A, 8B and 8C are graphs for the Hingorani system, with FIGS. 8A–8C showing waveforms of the capacitor voltage, the line current, and the thyristor current, respectively.
Figure 8B:
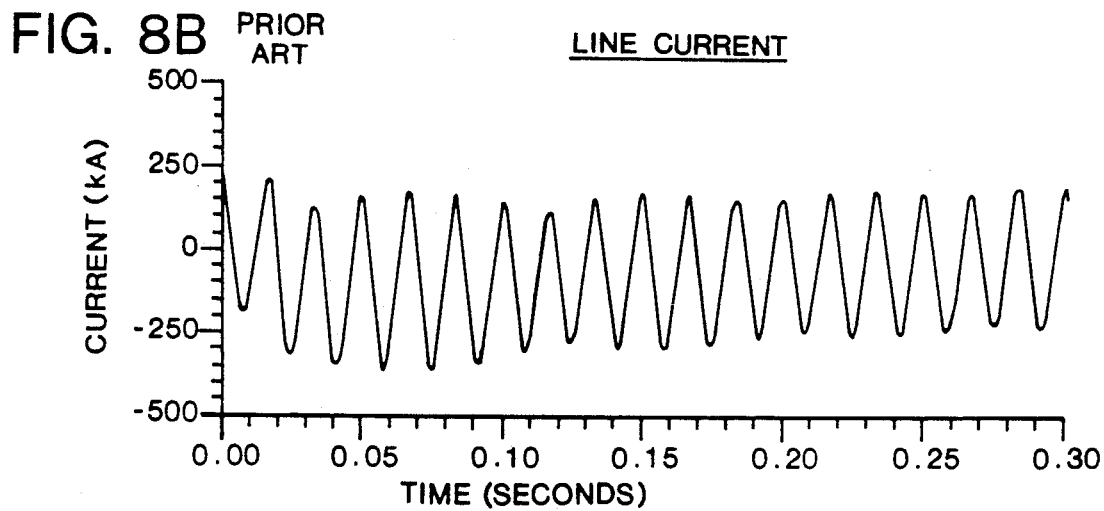
Figure 8C:
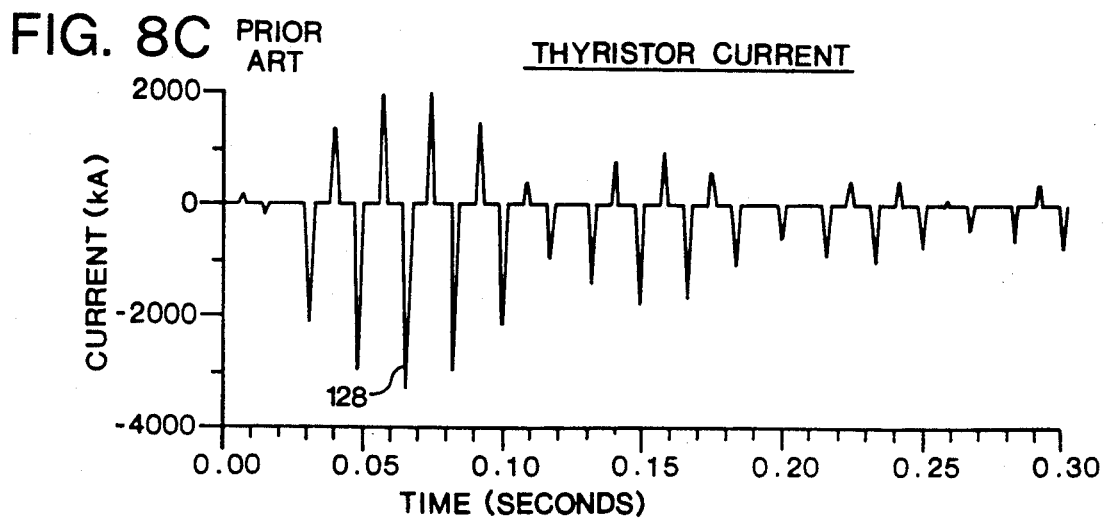

FIGS. 8A–8C show the response of the Hingorani system when used in a network having a transformer line inductance and a series capacitance chosen to resonate at 15 Hz. FIGS. 8A–8C show the response of the Hingorani system when subjected to a small system disturbance on the same order as that applied to the TCSC system 20 for FIGS. 6A–6C. A comparison of FIG. 8A with FIG. 7A, and FIG. 8B with FIG. 7B, shows that the Hingorani system provides an improved response over a circuit lacking any type of thyristor control. However, a comparison of the capacitor voltage traces of FIG. 6A with FIG. 8A, as well as the line current waveforms of FIGS. 6B and 8B, clearly shows that the TCSC system 20 provides significantly faster damping of the transient activity. The firing time prediction method of the TCSC system 20 contributes to this quick response, as well as the choice of a more accurate reference time than that of the earlier systems.

Furthermore, by comparing the thyristor current of FIG. 8C with that of FIG. 6C, it is clear that the TCSC system 20 significantly reduces the duty seen on the thyristors 36. For example, a maximum negative pulse 128 of the Hingorani system (see FIG. 8C) has an amplitude over 3,000 kA. In contrast, a maximum negative thyristor current pulse 130 shown in FIG. 6C has an amplitude of approximately one half that experienced in the Hingorani system. Therefore, by decreasing the peak current through the thyristor valve 35, the duty on the thyristors is significantly reduced, and consequently, the lifetime of thyristors 36 is increased.

Figure 9A:
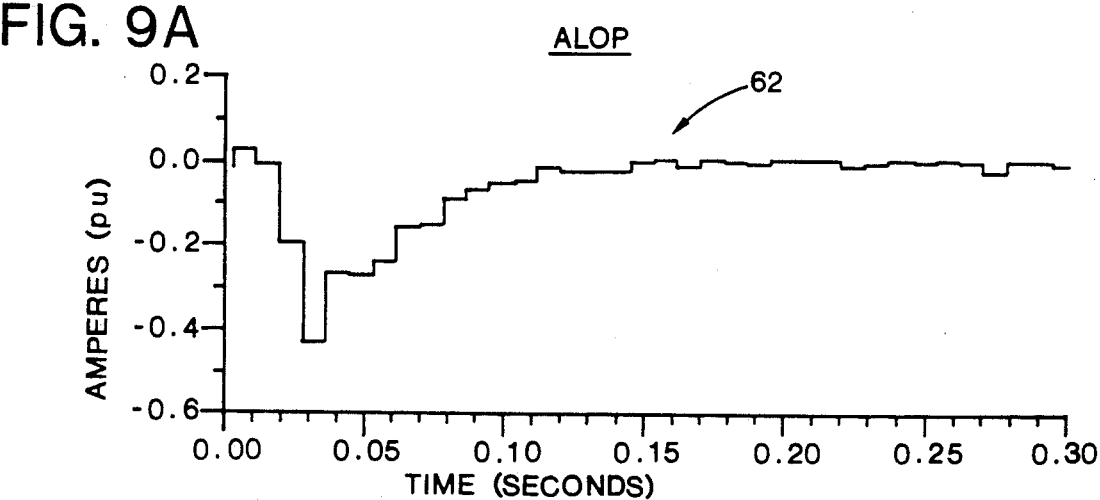
Figure 9B:
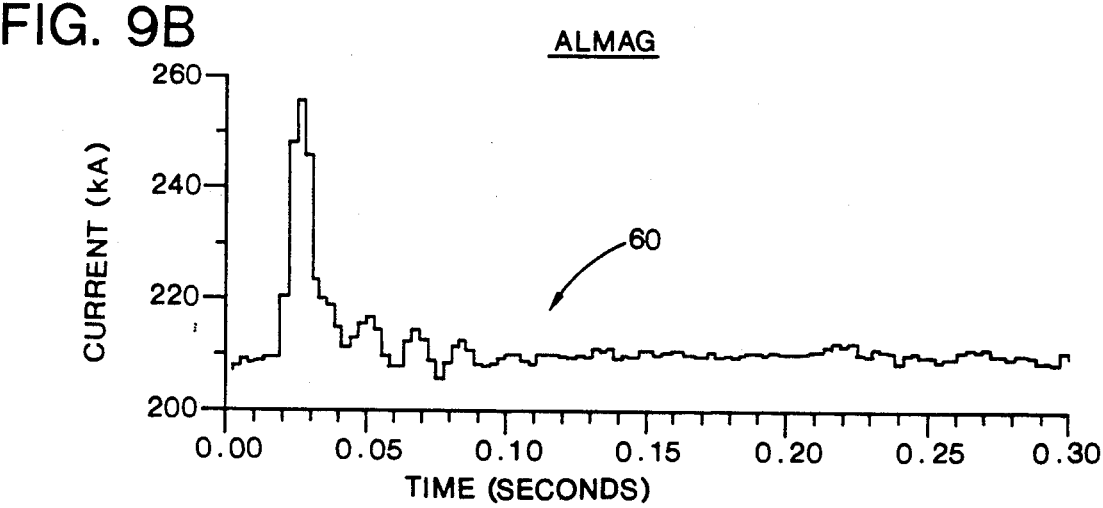
Figure 9C:
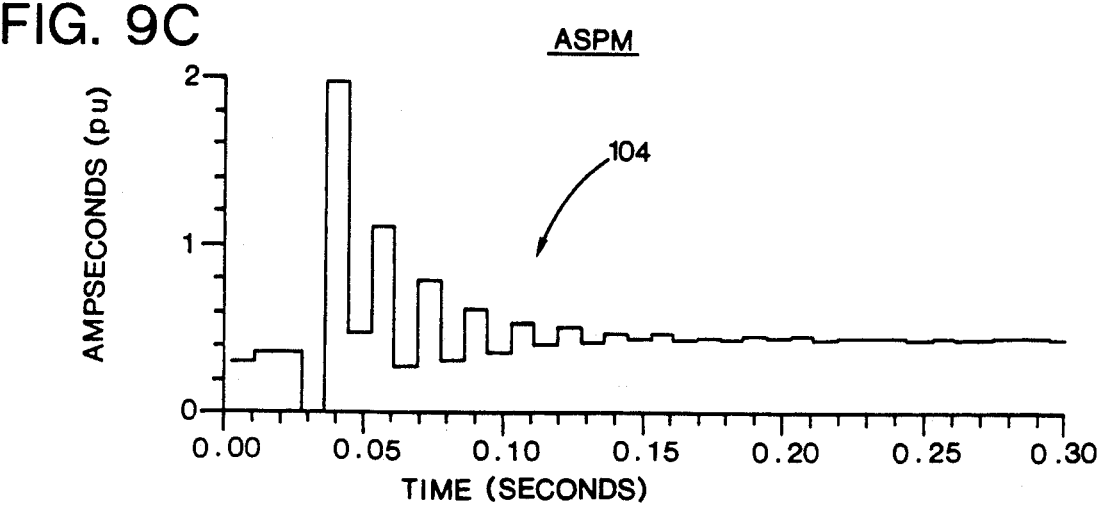
Figure 9D:
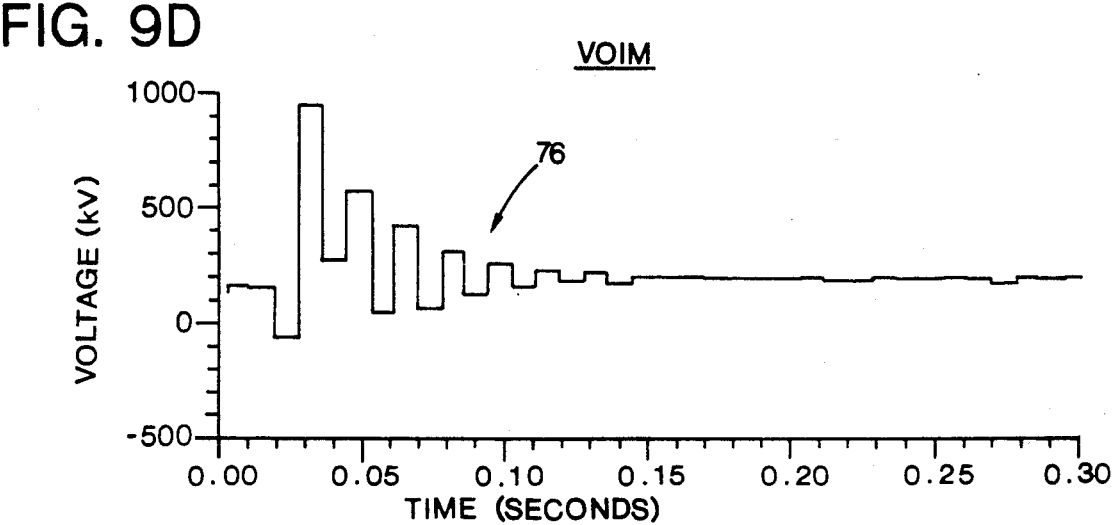
Figure 9E:
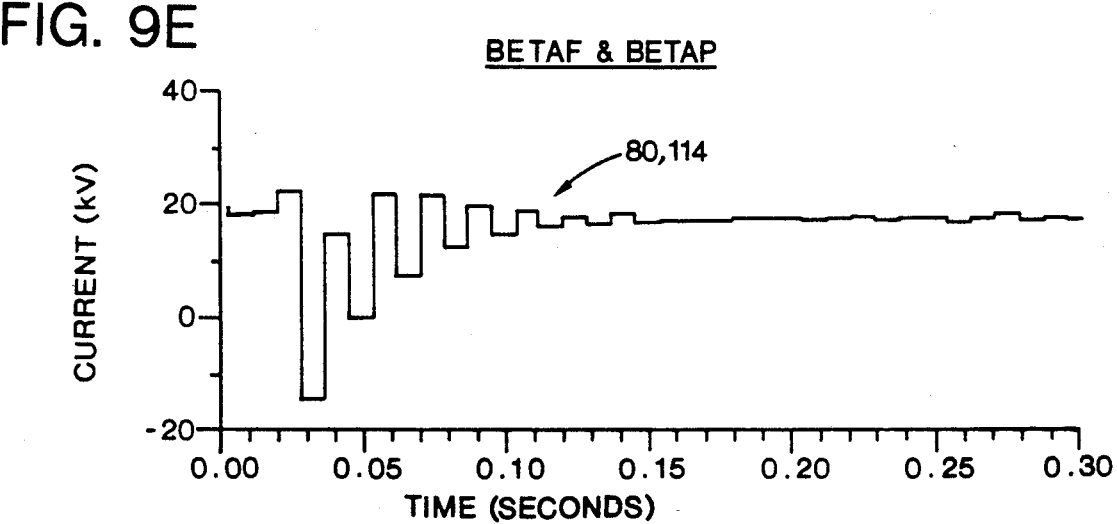
Figure 10:
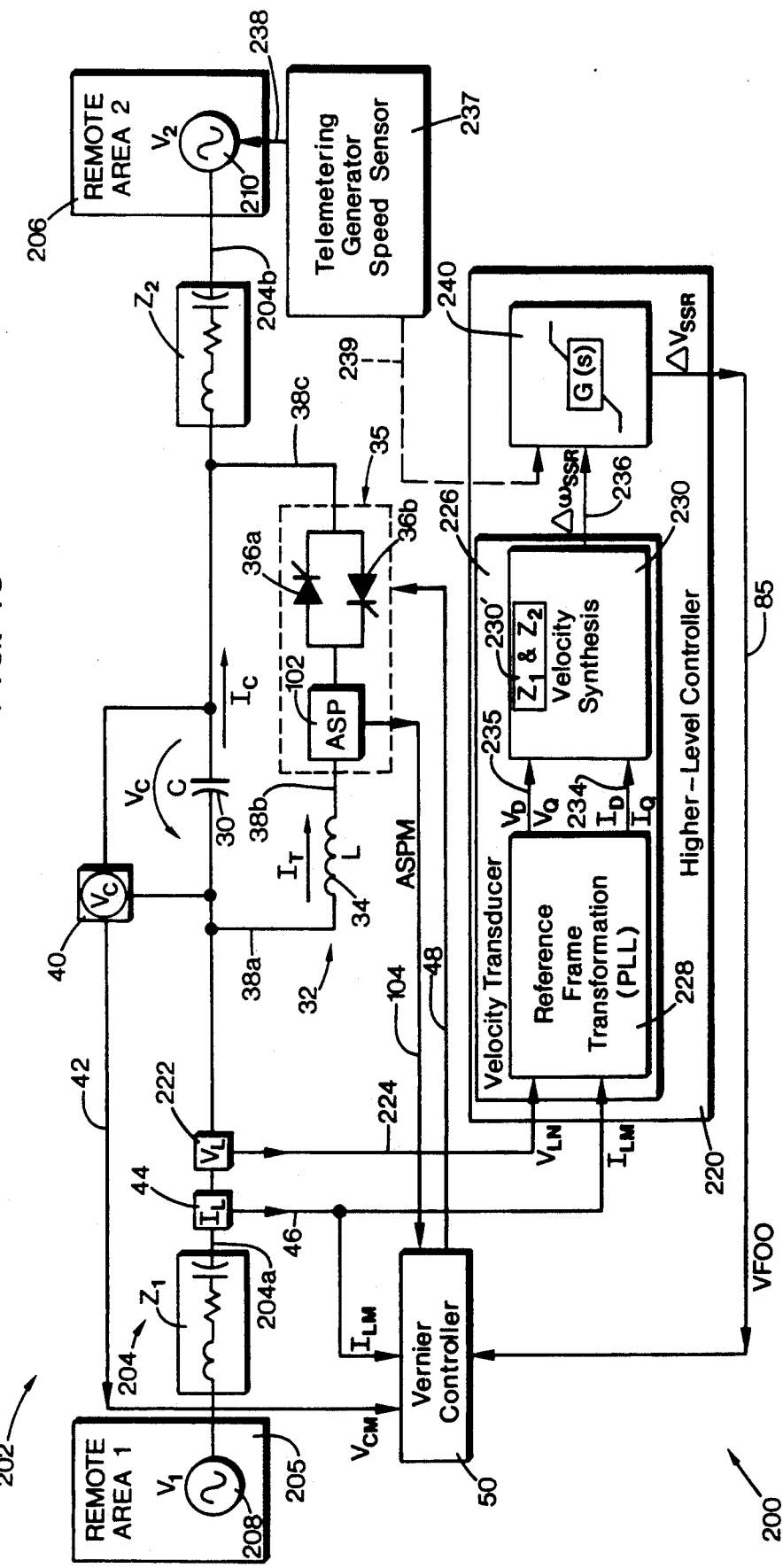
FIG. 10 is a single line schematic diagram of an alternate form of a thyristor controlled series capacitor system of the present invention.

FIGS. 9A–9E show the traces of several of the internal control variables in controller 50 for the 15 Hz subsynchronous resonance frequency example and the small disturbance of FIGS. 6A–6C. FIG. 9A illustrates the measured line current offset component ALOP signal 62 provided by the XDCR 56. FIG. 9B shows the line current magnitude ALMAG signal 60, also produced by the XDCR 56. FIG. 9C shows the measured thyristor ampsecond ASPM signal 104, measured by the ASP monitor 102. FIG. 9D illustrates the output of the $V_C$ predictor 55 portion of the controller 50, that is, the VOIM signal 76 produced by comparator 74, which is indicative of the initial offset before the thyristor current pulse. FIG. 9E illustrates the waveforms of the predicted firing angle BETAP signal 80 and the final firing angle command BETAF signal 114 when the BETAC correction signal 110 is zero Alternate Embodiments FIG. 10 illustrates another embodiment of a subsynchronous resonance mitigation apparatus as an alternate TCSC system 200 constructed in accordance with the present invention for damping undesirable subsynchronous oscillations and undesirable DC offset occurring in a power system or grid 202. The TCSC system 200 has a coupling apparatus, such as a thyristor controlled series capacitor 30, coupled in series with a transmission line 204 having segments 204a and 204b. Each transmission line segment 204a and 204b is illustrated as a series RLC (resistive, inductive, and capacitive) circuit, with segment 204a having an impedance of $Z_1$, and segment 204b having an impedance of $Z_2$.

The transmission line segment 204a couples the TCSC system 200 with a first remote area 205, and the second segment 204b couples the TCSC system with a second remote area 206. The first remote area 205 has a $V_1$ generator 208 which supplies voltage to the power system 202. The second remote area 206 has a $V_2$ generator 210 which also supplies power to the power system 202. It is apparent to those skilled in the art that the power system 202 having remote areas 205 and 206 is interchangeable with the power system 22 and load 26 illustrated in FIG. 1, and vice versa.

The TCSC system 200 is similar to the TCSC system 20 of FIGS. 1 and 2, with like items having like numbers. The TCSC system 200 includes an alternate higher-level controller 220 which generates the final offset ordered (VFOO) or voltage command signal 85, as does the higher-level controller 86 described above with respect to FIGS. 1 and 2. Other higher level controllers may also be used in addition to controller 220, as mentioned above with respect to controller 86.

The TCSC system 200 includes several power parameter monitoring sensors located remote from the $V_1$ and $V_2$ generators 208 and 210. The illustrated controller 220 receives the measured line current $I_{LM}$ signal 46 from the line current sensor 44. A line to neutral voltage sensor 222 monitors the line to neutral (or ground) voltage of the transmission line 204. Preferably, the sensor 222 is located between the line current sensor 44 and the commutating circuit 32. In response to this voltage, the line to neutral voltage sensor 222 produces a line to neutral voltage $V_{LN}$ signal 224. The $V_{LN}$ signal 224 is provided as an input to the higher-level controller 220.

The TCSC system 200 has a generator speed monitoring device which may be local to the higher level-controller or local to the generator (208 or 210). The term "local" as used herein when referring to the generator means at the generator, or within the power generation station switchyard. The term "local" as used herein when referring to the subsynchronous resonance mitigation apparatus means within the switchyard where the apparatus is located, or within about a mile or so thereof, and the term "remote" means beyond this area. When referring to the generator, the term "remote" as used herein means beyond the power generation station switchyard. The illustrated higher-level controller 220 may include a generator speed monitoring device, such as a velocity transducer portion or velocity transducer 226. The velocity transducer 226 has a reference frame transformation portion or reference transformer 228. The velocity transducer 226 also has a velocity synthesis portion or velocity synthesizer 230.

Figure 11:
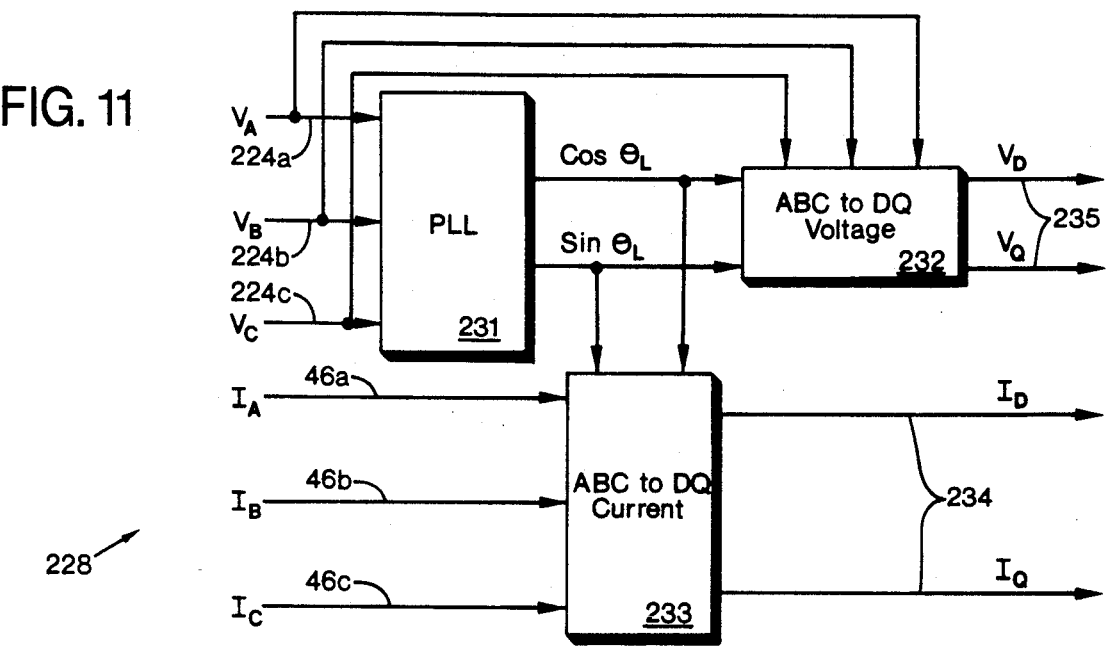
FIG. 11 is a block diagram of one form of a reference frame transformation portion of the system of FIG. 10.

One manner of implementing the reference frame transformation portion 228 is shown in FIG. 11. The reference transformer 228 receives each phase of the line to neutral voltage signal 224, shown as signals 224a, 224b, and 224c. The reference transformer 228 also receives each phase of the measured line current signal 46, shown as signals 46a, 46b, and 46c. The reference transformer 228 has a phase-locked loop (PLL) device 231, which may be as described above for the phase-locked loop device 52 described above. Using conventional ABC-to-DQ voltage and current converter devices 232 and 233, respectively, the ABC phase signals may be transformed to produce quadrature line currents signals $I_D$ and $I_Q$ 234, as well as direct quadrature voltage signals $V_D$ and $V_Q$ 235. These direct and quadrature voltage signals $V_D$ and $V_Q$ 235, and the quadrature line currents signals $I_D$ and $I_Q$ 234, represent the respective direct current, quadrature current, direct voltage, and quadrature voltage at the measuring site with respect to the rotating reference frame established by the PLL device 231. It is apparent that the reference transformer 228 may be implemented in a variety of other structurally equivalent hardware and software forms known to those skilled in the art.

The direct and quadrature voltage and current signals may be transformed in a conventional manner into a synchronously rotating reference frame rotating at a fundamental system frequency ($f_O$ in Hertz, and $\omega_O$ in radians per seconds) which is in phase with the voltage at sensor 222. In the illustrated embodiment, the reference transformer 228 synchronously samples the phase variable voltages and currents with the PLL device 231 acting as a sampling device that is phase locked to the line to neutral voltage $V_{LN}$ via signal 224. Preferably, the sampling is updated during each sample time of the process to provide a wide band-width measurement, on the order of 0-120 Hz at least.

The reference transformer 228 demodulates the input so that the fundamental frequency inputs produce constant outputs in steady state. Subsynchronous voltage inputs at a frequency $f_N$ produce subsynchronous frequency outputs at a frequency of $(f_O - f_N)$ and supersynchronous frequency outputs at a frequency of $(f_O + f_N)$, where $f_O$ is the fundamental frequency of the power system 202. Various other structurally equivalent transducers known to those skilled in the art, such as power transducers, may be substituted for the sensors described herein to provide transformed inputs having the frequency transformer property described above.

A preferred output for the velocity transducer 226 is a measure of generator velocity, for example in radians per second ($\omega$) for a generator at some remote point in the power system 202, for example generators 208 or 210. The velocity synthesizer 230 synthesizes this remote velocity from the transformed voltage and current values ($V_D$, $V_Q$, $I_D$, and $I_Q$) based on a knowledge of the external transmission line impedances, such as the $Z_1$ and $Z_2$ impedances of the first and second transmission line segments 204a and 204b, respectively. The line impedances $Z_1$ and $Z_2$ taken into account include series capacitors, including both fixed values within $Z_1$ and $Z_2$ and the thyristor controlled capacitor 30, as well as any local series voltage sources, such as a series connected current or voltage source inverters, as discussed further below (see FIG. 14).

Figure 12:
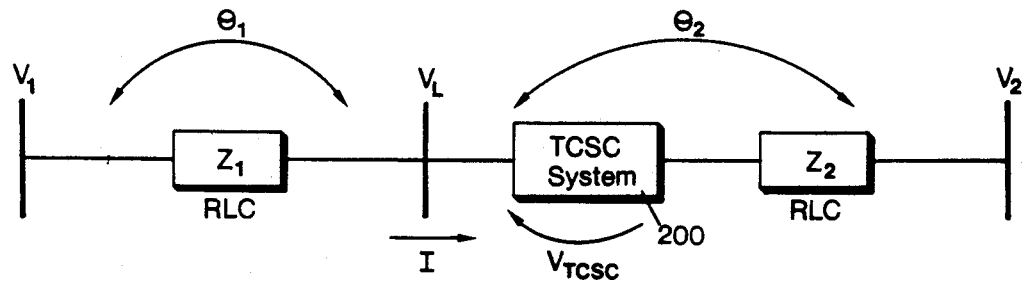
FIG. 12 is a block diagram of one manner of operating the higher-level controller of FIG. 10.

Referring to FIG. 12, the operation of the velocity synthesizer 230 is illustrated. In FIG. 12, the voltages of the generators 208 and 210 are represented as $V_1$ and $V_2$, respectively. The RLC impedance $Z_1$ has a power angle $\theta_1$. The power angle $\theta_2$ represents the power angle of the combined RLC impedance $Z_1$ and the impedance of the coupling device capacitor 30 and commutating circuit 32. The equations for determining the generator voltages $V_1$ and $V_2$ are:

$$\overline{V}_1 = \overline{V}_L + (\overline{Z}_1)(\overline{I})$$

$$\overline{V}_2 = \overline{V}_L - (\overline{Z}_2)(\overline{I}) - V_{TCSC}$$

The velocity synthesis portion 230 finds the direct and quadrature voltages $V_D$ and $V_Q$ at some remote bus, such as the first or second remote areas 205 or 206, representing the first turbine-generator $V_1$ voltage source 208 or the second turbine-generator $V_2$ voltage source 210, according to the following equations:

$$V_{1D} = V_{LD} + R_1 I_D + X_1(sI_D - \omega I_Q) + V_{1CD}$$
$$V_{1Q} = V_{LQ} + R_1 I_Q + X_1(\omega I_D + sI_Q) + V_{1CQ}$$
$$sV_{1CD} = X_{1C} I_D + \omega V_{1CQ}$$
$$sV_{1CQ} = X_{1C} I_Q - \omega V_{1CD}$$
and
$$V_{2D} = V_{LD} - R_2 I_D - X_2(sI_D - \omega I_Q) - V_{2CD} - V_{TCSCD}$$
$$V_{2Q} = V_{LQ} - R_2 I_Q - X_2(\omega I_D + sI_Q) - V_{2CQ} - V_{TCSCQ}$$
$$sV_{2CD} = X_{2C} I_D + \omega V_{2CQ}$$
$$sV_{2CQ} = X_{2C} I_Q - \omega V_{2CD}$$

where s = the Laplace transform, d/dt. Thus, the synthesis of the voltages $V_1$ and $V_2$ occurs based upon a rotating reference frame.

The velocity synthesizer 230 determines the velocity of the remote generator 208 or 210 from the rate of change of phase of the remote bus voltage $V_1$ or $V_2$. The phase of the internal voltage ($V_1$ or $V_2$) of the remote generator (208 or 210) is derived from the inverse tangent or arctan of the quotient of the remote bus quadrature axis voltage $V_{NQ}$ divided by the direct axis voltage $V_{ND}$ as shown below:

$$\Theta_1 = \arctan [V_{1Q} \div V_{1D}] \approx [V_{1Q} \div V_{1D}]$$

$$\Theta_2 = \arctan [V_{2Q} \div V_{2D}] \approx [V_{2Q} \div V_{2D}]$$

The velocity of the remote generator 208 or 210 is determined by the velocity synthesizer 230 according to the following equation:

$$\omega_1 = \omega_L + s\Theta_1 = \Delta\omega_{1SSR}$$

$$\omega_2 = \omega_L + s\Theta_2 = \Delta\omega_{2SSR}$$

where $\omega_L$ is the fundamental frequency established by the reference transformer 228 to maintain synchronism with the system frequency of the power system 202. The synthesized generator velocity $\Delta\omega_{SSR}$ signal 236 is the output of the velocity synthesizer 230 and, hence, the output of the velocity transducer 226. The $\Delta\omega_{SSR}$ signal 236 represents the speed of the generator 208 or 210.

The series compensation level, network inductance, and topology information may be telemetered from another remote control location to adjust the above equations during operation. For example, the transmission line impedances $Z_1$ and $Z_2$ may be determined by measuring line parameters either local to the generator or local to the TCSC system 200. If measured local to the generator, the data may be telemetered to the TCSC system 200. Alternatively, the transmission line impedances $Z_1$ and $Z_2$ may be determined based upon known changes to the power system 202. For example, when the generator 210 is taken off-line, or a major transmission line, such as line 204b, is taken out of service, the overall impedance of the transmission line 204 changes. Such power system status information may be provided, for example, via telemetry, as a breaker status data input signal (not shown) to the velocity synthesizer 230. Alternatively, the breaker status may be monitored local to the TCSC system 200. In response to such status inputs to the power system 202, the velocity synthesizer 230 may revise the values for the line impedances $Z_1$ and $Z_2$ based upon transmission line characteristics stored within an impedance memory device 230' of the velocity synthesizer 230.

Measurements of parameters of the power system are preferred to be taken local to the TCSC system 200 to determine the $\Delta\omega_{SSR}$ signal 236 because transmission errors are then eliminated. However, as an alternative to the velocity transducer 226, the generator speed monitoring device of the higher-level controller 220 may comprise a telemetering generator speed sensor 237. The speed sensor 237 may be positioned local to the generator, for example at generator 210. The generator speed sensor 237 may be coupled to receive a generator speed signal from a conventional generator speed monitoring device, indicated schematically by the arrow labeled 238 in FIG. 10. It is apparent to those skilled in the art that other structurally equivalent telemetering speed sensor devices may be substituted for those illustrated herein; for example, the speed monitoring device 238 may be integral to the telemetering generator speed sensor 237. In response to the speed monitoring device 238, the telemetering sensor 237 transmits a generator speed transmission signal 239 to the higher-level controller 220 by any type of transmission device, such as by modem over telephone lines, by microwave transmission, satellite transmission, fiber optics communication technology, etc.

Figure 13:
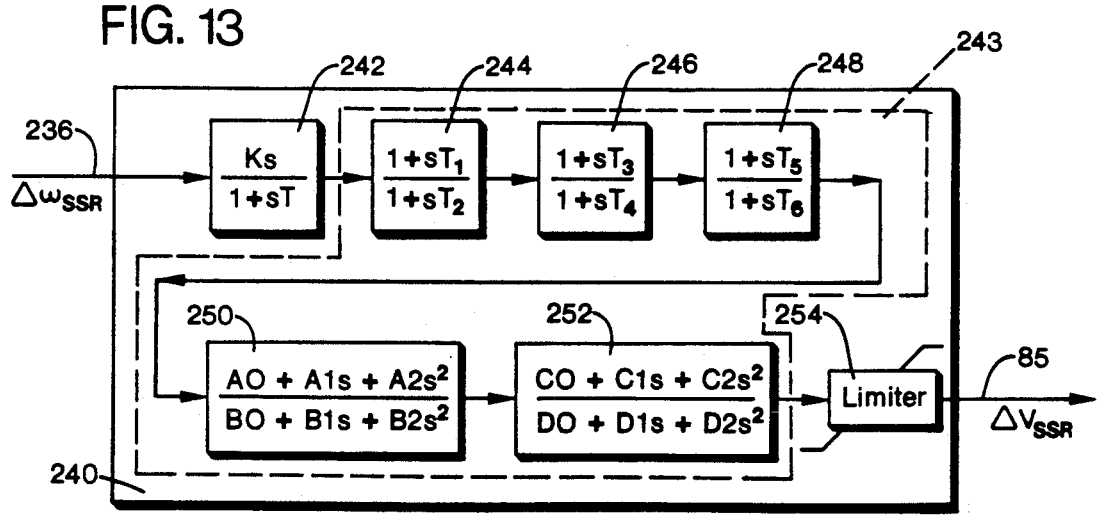
FIG. 13 is a block diagram of one form of a conditioner portion of the higher-level controller of FIG. 10.

The synthesized generator velocity transducer output $\Delta\omega_{SSR}$ signal 236 is conditioned by a conditioner 240 according to a controller function G(s), one possible form of which is illustrated in FIG. 13. The conditioner 240 phase conditions the output of the higher-level controller 220 to cancel any phase lags in the thyristor controlled series capacitor 30 and commutating circuit 32. The conditioner 240 also compensates for variations in the external reactances of the power system 220 for variables used in the synthesis of the remote generator velocity.

To perform these functions, the conditioner 240 shown in FIG. 13 has a first order wash-out stage 242 which receives the synthesized generator velocity $\Delta\omega_{SSR}$ signal 236. The wash-out stage 242 is coupled to a phase compensation device 243. The phase compensation device 243 may have one or more first and second order lead/lag stages. The illustrated phase compensation device 243 has three first order lead/lag stages 244, 246 and 248. These lead/lag stages 242-248 are followed by two complex second order lead/lag stages 250 and 252. The conditioner 240 also has a limiter 254 for limiting the magnitude of output of the phase compensation device 243. The output of limiter 254 provides a change in subsynchronous voltage command $\Delta V_{SSR}$ signal as the higher-level controller output. For the TCSC system 200, the voltage command $\Delta V_{SSR}$ signal corresponds to the final offset ordered or command voltage VFOO signal 85 described above.

The conditioner 240 amplitude modulates the fundamental frequency voltage of the TCSC capacitor 30 and commutating network 32 at a frequency $f_N$. This amplitude modulation produces series subsynchronous and supersynchronous voltage components at frequencies $f_O - f_N$ and $f_O + f_N$, respectively. These subsynchronous and supersynchronous voltage components induce corresponding frequency currents in the transmission line 204. When the corresponding frequency currents flow in the stator windings of a remotely connected generator, such as generator 208 or 210, these currents cause a subsynchronous electromagnetic torque component at frequency $f_N$. This subsynchronous electromagnetic torque component is caused by virtue of the natural demodulation process of a synchronous generator.

In operation, the subsynchronous phase variable inputs $V_{LN}$ and $I_{LM}$ to the reference transformer 228, caused by the motion or variation in velocity of the generators 208 and 210, are cancelled by the action of the higher-level controller 220. The higher-level controller 220 senses the generator velocity from the measured line current $I_{LM}$ signal 46 and the line to neutral voltage $V_{LN}$ signal 224, and in response thereto transforms this frequency into an appropriate reference frame with the reference transformer 228. Alternatively, the telemetering generator speed sensor device 237 transmits a generator speed signal 239 from, for instance, generator 210, to the phase conditioner 240. The phase conditioner 240 determines the appropriate gain of the required correction. The phase conditioner 240 conditions the magnitude of the $\Delta\omega_{SSR}$ signal 236 to provide a change in voltage output signal $\Delta V_{SSR}$ signal or VFOO offset voltage command signal 85. The offset voltage command signal 82 is delivered to the firing time or vernier controller 50, which may operate as described above, when receiving the VFOO command signal 85. Thus, the higher-level controller 220 establishes a feedback control arrangement for the generator velocity to dampen any torsional oscillations at frequency $f_N$. Advantageously, this damping process is wide-band and works well for all frequencies $f_N$ in the subsynchronous frequency range.

Figure 14:
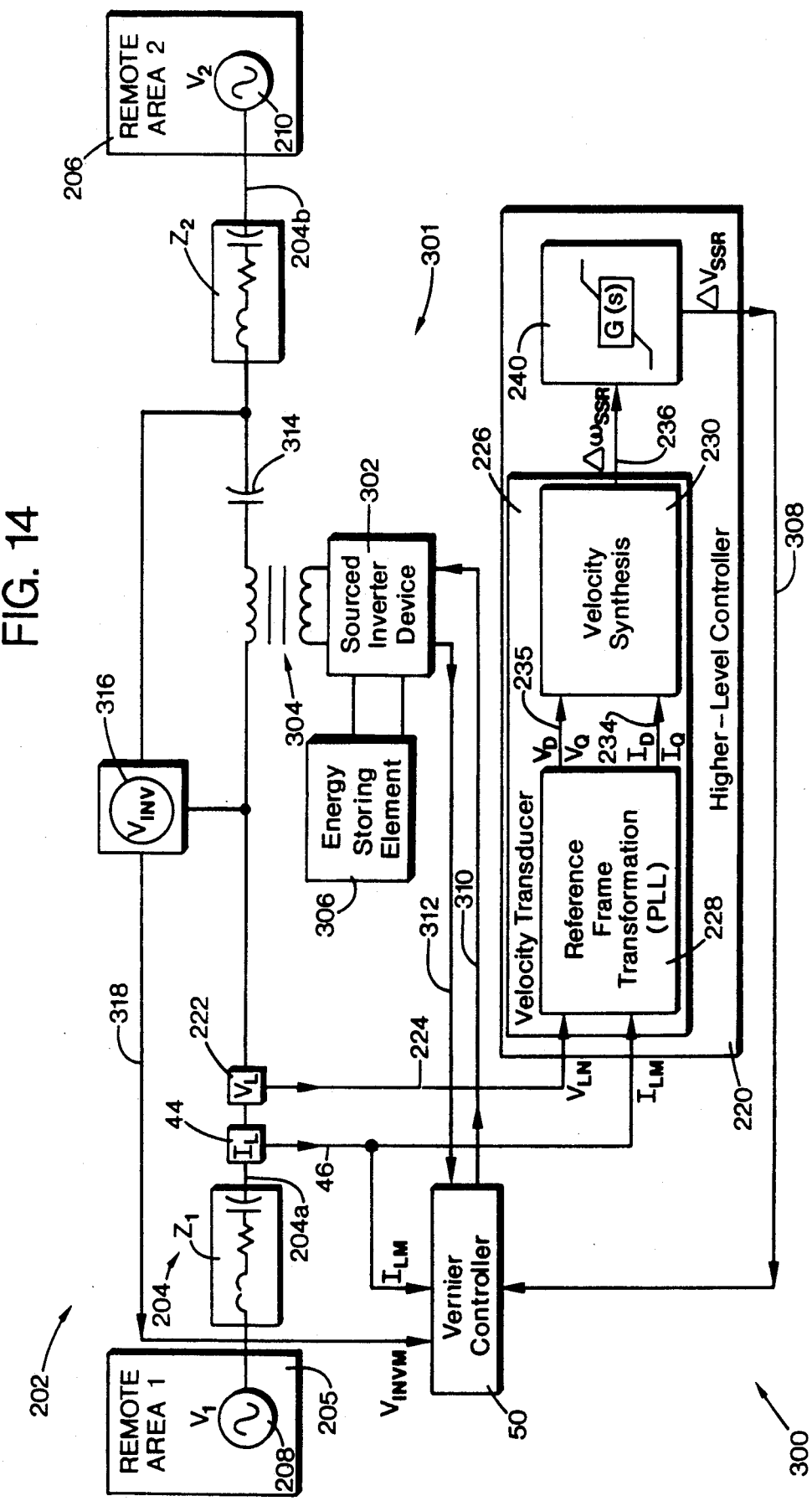
FIG. 14 is a single line diagram of an alternate subsynchronous resonance mitigation system of the present invention.

FIG. 14 illustrates an alternate subsynchronous resonance mitigation apparatus 300 constructed in accordance with the present invention, and illustrated as coupled to the power system 202 described above. The apparatus 300 has several components as previously described, which share like numbers. The apparatus 300 includes coupling apparatus, such as an inverter coupling apparatus 301 comprising a sourced inverter device 302, a coupling transformer 304, and an energy storing element 306. The coupling transformer 304 couples the sourced inverter device 302 to the transmission line 204. The sourced inverter device 302 is coupled to the energy storing element 306. The sourced inverter device 302 may be a voltage source inverter, in which case the energy storing element 306 may be a DC capacitor or a battery. The sourced inverter device 302 may also be a current source inverter, and in this case, the energy storing element 306 may be an inductor. Such current and voltage source inverters, as well as their structural equivalents which may be substituted therefore, are known to those skilled in the art.

The output of limiter 254 provides a change in subsynchronous voltage command $\Delta V_{SSR}$ signal 308 as the higher-level controller output. For the TCSC system 300, the voltage command $\Delta V_{SSR}$ signal corresponds to the final offset ordered or command voltage VFOO signal 85 described above. The offset voltage command signal 308 is delivered to the firing time or vernier controller 50, which may operate as described above, when receiving the VFOO command signal 85. The vernier controller 50 supplies a firing pulse signal 310, similar to the firing signal 48 described above, to the inverter device 302. The sourced inverter device 302 may also provide an optional feedback signal 312, which may be similar to the ASPM signal 104 described above. When using the inverter device 302, an optional capacitor 314 may be inserted in the transmission line 204 in series with the coupling transformer 304. A voltage sensor, such as a voltmeter $V_{INV}$ 316, may be used to monitor the voltage supplied to the transmission line 204 by the inverter device 302 across the coupling transformer 304, and the voltage across capacitor 314. In response to the measured voltage, the inverter voltmeter $V_{INV}$ 316 generates a measured inverter voltage $V_{INVM}$ signal 318 which is provided to the vernier controller 50. It is apparent to those skilled in the art that the inverter voltage $V_{INVM}$ may also be inferred from other parameters, rather than measured directly. The vernier controller 50 may process the inverter voltage $V_{INVM}$ signal 318 in a similar manner as described above for the measured capacitor voltage $V_{CM}$ signal 42, as is known to those skilled in the art. The operation of the higher-level controller 220 may be as described above with respect to FIGS. 10–13.

Figure 15:
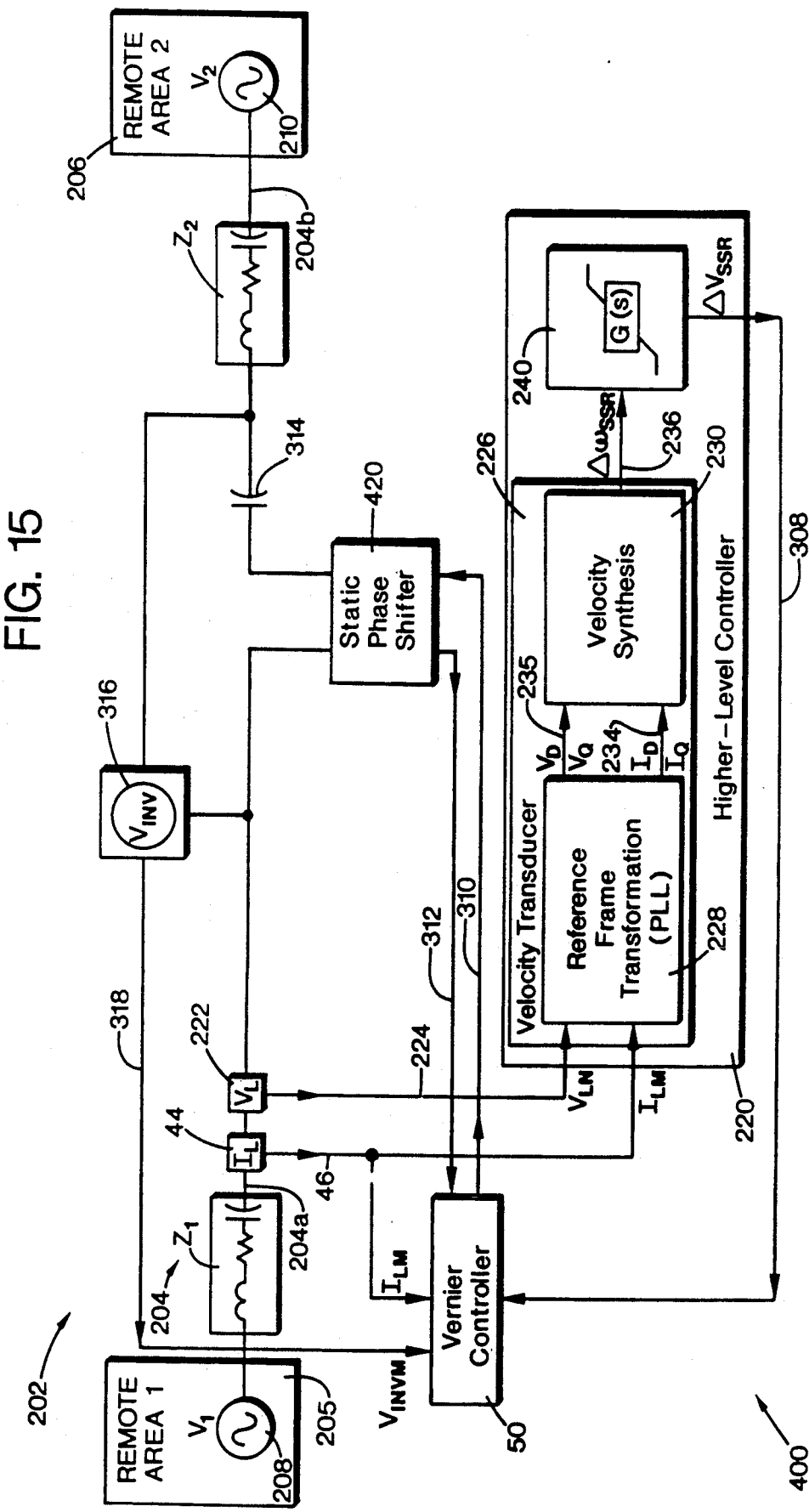
FIG. 15 is a single line diagram of another alternate subsynchronous resonance mitigation system of the present invention.

FIG. 15 illustrates another alternate subsynchronous resonance mitigation apparatus 400 constructed in accordance with the present invention, and illustrated as coupled to the power system 202 described above. The apparatus 400 has several components as previously described, which share like numbers. The apparatus 400 includes thyristor-controlled phase regulator or a static phase shifter, such as a variable susceptance static phase shifter 420, as the coupling apparatus instead of the inverter coupling apparatus 301. One suitable static phase shifter is disclosed in U.S. patent application Ser. No. 07/742,859, filed Aug. 8, 1991, the disclosure of which is hereby incorporated by reference.

Figure 16:
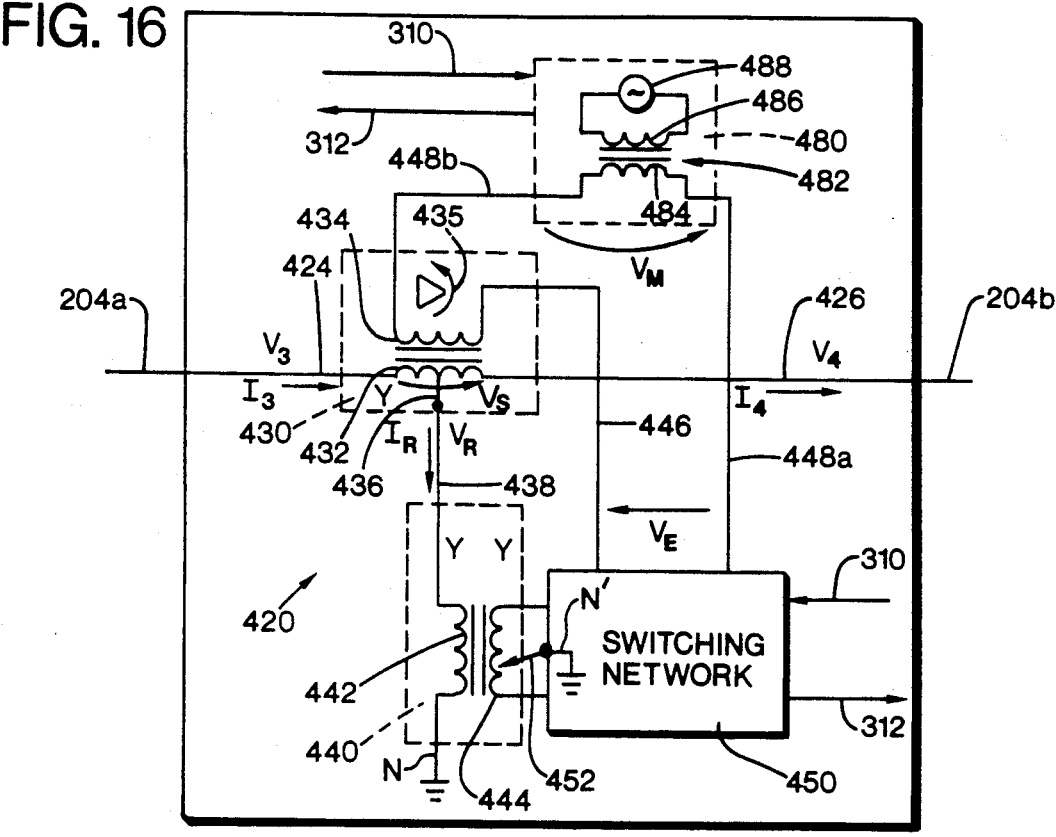
FIG. 16 is a single line diagram of one form of a static phase shifter coupling apparatus of FIG. 15.

A preferred embodiment of the static phase shifter 420 is shown in the single phase diagram of FIG. 16. The illustrated static phase shifter 420 is described assuming a power flow from an input side 424 coupled to transmission line segment 204a through the phase shifter 420 to an output side 426 coupled to the transmission line segment 204b. At the input side 424, the incoming voltage and current are indicated as $V_3$ and $I_3$, respectively, while at the output side 426, the outgoing voltage and current are indicated as $V_4$ and $I_4$, respectively.

The phase shifter 420 has a transformer set illustrated as comprising a three-phase wye-delta series transformer 430, with each phase having a series winding 432 magnetically coupled with an excited winding 434. The excited winding 434 is connected in a rotated delta configuration, as indicated by the triangle with the curved arrow 435 appearing adjacent to winding 434. The series winding 432 is in series with, and couples together, the transmission line segments 204a and 204b. The voltage across the series winding is indicated as $V_S$. The illustrated series winding 432 has a center tap 436 which draws a regulating current $I_R$ at a regulating voltage $V_R$ from the series winding 432.

A three-phase conductor 438 delivers the regulating current $I_R$ from the center tap 436 to a wye/wye three-phase regulating transformer 440, and more specifically to a three phase primary thereof, with each primary phase comprising an exciting winding 442. The three exciting windings 442 are coupled together at a neutral point N to complete the wye connection. Each phase of the regulating transformer 440 secondary side comprises a regulating winding 444 magnetically coupled with an associated exciting phase winding 442 of the primary.

Three-phase conductors, indicated as conductors 446, 448a and 448b in the single phase representation of FIG. 16, couple the regulating winding 444 of each phase with the series transformer excited winding 434 for each phase through a modulator 480 (described further below) and via the internal connections of a switching network 450. The excited windings 434 are coupled in a rotated delta connection with the regulating windings 444. For instance, in a rotated delta connection, the phase A excited winding is connected with the phase C regulating winding. In essence, this connection subtracts the 30° wye/delta phase shift from the 120° difference between the A and C phases. Thus, the series winding voltage $V_S$ is in quadrature (i.e., $120° - 30° = 90°$) with the regulating voltage $V_R$ of the regulating transformer exciting winding 442.

Figure 17:
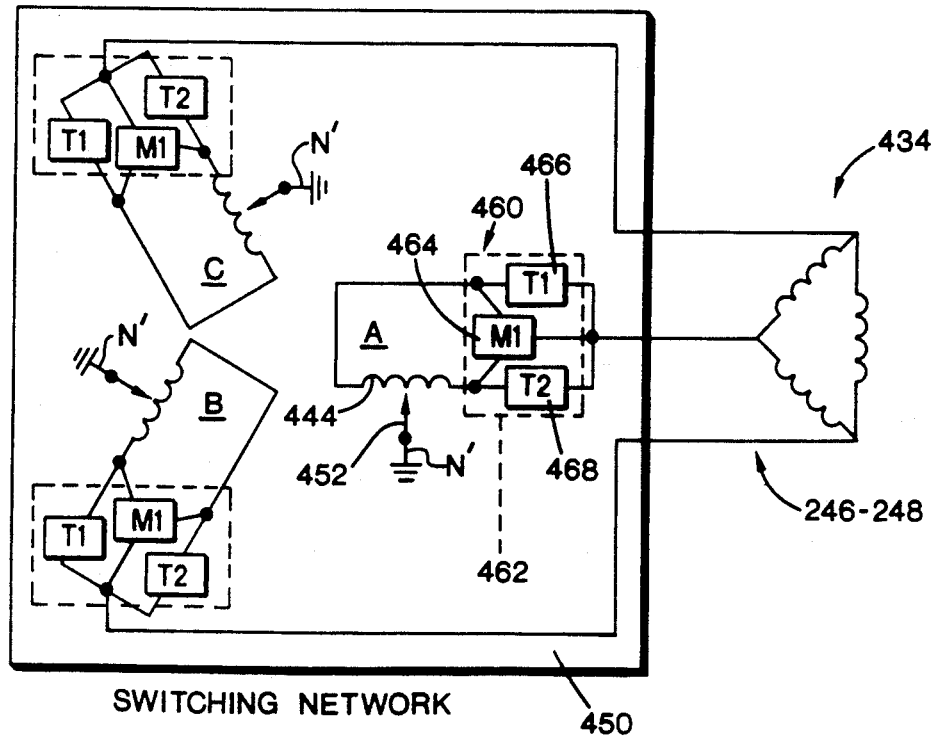
FIG. 17 is a three-phase schematic block diagram of one form of a switching network of FIG. 16 using a thyristor-augmented reversing switch scheme.

The switching network 450 may be a fast-acting network as illustrated in FIG. 17. The switching network 450 has a three-phase load tap changing device or load tap changer (LTC), with a single-phase LTC 452 for each phase. Each single-phase LTC 452 is controlled by the switching network 450 to move between a plurality of conventional taps (not shown) on the regulating winding 444. The LTC device may be a conventional three phase LTC, which for each phase A, B and C, simultaneously selects one of the taps between the opposing ends of winding 444. For simplicity, while each of the phases designated A, B and C are shown in FIG. 17, the illustrated embodiment is discussed with reference to only the phase A leg 462. Each LTC 452 couples the selected tap to a neutral ground point N' to complete the wye connection of the regulating windings 444. The output phase voltage for the switching network 450 between conductors 446 and 448a is the voltage $V_E$ (see FIG. 16).

The phase A leg 460 has a three-phase mechanical thyristor-augmented reversing switch assembly 462 which has a reversing switch 464, also designated as M1. The reversing switch assembly 462 selectively couples either end of the regulating winding 444 with the excited windings 434. The reversing switch 464 cooperates with the LTC 452 to establish a nominal phase-shifting voltage level on the series transformer series winding 432. The reversing switch 464 may be a conventional three phase reversing switch which simultaneously switches between the opposing ends of winding 444 for each phase A, B and C.

The reversing switch 464 is augmented by a pair of conventional bi-directional thyristor valves 466 and 468, also designated T1 and T2, respectively. The reversing switch 464, the thyristor valves 466 and 468 operate in response to the firing command signal 310. An optional feedback signal 312 may be generated by the static phase shifter 420. The thyristor valves described herein may be constructed of a plurality of discrete thyristors, which may be conventional thyristors, gate-turn-off thyristors (GTOs), MOS-controlled thyristors (metal-oxide-silicon), and the like or combinations thereof known to be interchangeable by those skilled in the art. The reversing switch assembly 462 causes a net change of phase shift which is equal to the rated maximum phase shift of the phase shifter 420.

In operation, the reversing switch assembly 462 is preferably operated in the following manner. During steady-state conditions, the M1 reversing switch 464 conducts the current, and the T1 and T2 valves 466, 468 are open, that is, in a non-conducting state. For switching operations, the M1 reversing switch 464 is opened and the current previously passing therethrough is commutated to either the T1 valve or the T2 valve. Either the T1 valve or the T2 valve will continue to conduct according to the needs of the overall power system until a new steady-state condition is reached. Upon reaching the new steady-state condition, the M1 reversing switch 464 may be reclosed while the T1 and T2 valves 466, 468 revert to an open non-conducting state. Allowing the mechanical M1 reversing switch 464 to conduct during steady-state conditions, rather than the thyristor valves, advantageously reduces steady-state losses.

Furthermore, by employing a pair of thyristor valves 466 and 468 for each phase, the reversing switch assembly 462 may be operated many times during a system swing when the transmission line 204 is experiencing rapid power fluctuations. The pair of valves 466 and 468 advantageously provide for very little delay during such rapid multiple operation of the M1 reversing switch 464 to provide discrete changes in the setting of the phase shifter 420 during such system swings. The switching may occur at a frequency of twice the frequency of the transmission line 204, that is, during every half cycle at a zero-crossing of the line current waveform. The magnitude of the discreet step provided by switching network 450 is on the order of the maximum phase shift of the phase shifter 420.

The phase shifter 420 also includes the modulator 480 which may comprise a variable source device, such as the illustrated voltage source inverter (VSI) device. The illustrated VSI device 480 may have an optional three-phase coupling transformer 482 with magnetically coupled primary and secondary windings 484 and 486, respectively. An AC source, such as a conventional variable voltage source inverter (VSI) 488 is coupled in series with the coupling transformer secondary winding 486. The illustrated voltage source inverter device 480 may operate in response to the firing command signal 310 from the vernier controller 50, and provide the optional feedback signal 312. It is apparent to those skilled in the art that other monitors (not shown) may be used at various locations within the static phase shifter 420 to provide the optional feedback signal 312. The voltage source inverter device 480 modulates the series injection of voltage Vs into the series winding 432 via the excited winding 434.

Other inverter technologies, including solid state converter technology, which produce comparable effects may be used as the variable source device, such as a conventional current source inverter or other devices known to be interchangeable by those skilled in the art. For example, a variable susceptance device (not shown) may be substituted for modulator 480, such as a conventional switched capacitor controlled by mechanical switches or thyristors (not shown). Alternatively, the variable susceptance device may be a conventional switched inductor controlled by mechanical switches or thyristors (not shown). In some applications, the variable susceptance device may include an optional three-phase coupling transformer (not shown).

The VSI device 480 is in series with the excited winding 434 of the series transformer 430 to modify the phase voltage output $V_E$ of the regulating transformer 444 and switching network 450 by a modulation voltage $V_M$. The VSI device 480 may have, for example, a relatively small rating on the order of 10% of the through power rating of the phase shifter 420. The VSI device 480 provides modulation capability on the order of approximately a few degrees of phase shift. This example is based on likely economic choices, but it is apparent that other selections may also be made to accommodate various implementations.

The basic function of the phase shifter 420 is to inject a variable voltage $V_S$ in series with the transmission line 402 to mitigate undesirable subsynchronous resonance in the turbine-generator unit 208 or 210. The effective phase shift is nearly proportional to the voltage magnitude $|V_S|$ of the series winding 432. Thus, using a thyristor-controlled device capacitor or inductor is particularly advantageous to rapidly modulate the injected series voltage $V_S$ about a nominal phase-shifting voltage level established in part by the mechanical LTC 452. This modulation is accomplished by changing the value of the variable susceptance, which changes the value of $V_E$ supplied by the regulating windings 444 and switching network 450, to vary and modulate the value of $V_S$ injected into the transmission line 402.

The VSI device 480 has an effect similar to applying a static VAR (volt-amperes-reactive) compensator (SVC) at a bus in the vicinity of the phase shifter 420. However, the VSI device 480 advantageously gains leverage on the series voltage $V_S$ injected by the phase shifter 420, via the leakage impedance of the series and regulating transformers 430 and 440, which a local SVC would not be able to accomplish. The equipment used to construct the VSI device 480 may be similar to a typical SVC device.

Having illustrated and described the principles of our invention with respect to a preferred embodiment, it should be apparent to those skilled in the art that our invention may be modified in arrangement and detail without departing from such principles. For example, other combinations of hardware and software may be used to implement the functions of the higher-level controller embodiments 86 and 220, as well as the vernier controller 50, described herein. Furthermore, other types of sensors and signal processors may be used to provide the measured power line parameter signals and generator speed signals. Such structural equivalents for the sensors and the components of the higher-level controller 220 and the vernier controller 50 are known to be interchangeable by those skilled in the art and may be substituted for those illustrated herein. We claim all such modifications falling with the scope and spirit of the following claims.

We claim:

1. A subsynchronous resonance mitigation system for damping subsynchronous resonance oscillations occurring in a generator from a transmission line coupled to the generator, comprising:
   a coupling apparatus for coupling to the transmission line, the coupling apparatus responsive to a firing command to introduce subsynchronous resonance mitigating currents into the transmission line;
   a higher-level controller having a generator speed monitoring device and producing in response thereto a voltage command; and
   a firing time controller responsive to the voltage command for providing the firing command to the coupling apparatus.

2. A subsynchronous resonance mitigation system according to claim 1 wherein the coupling apparatus comprises a thyristor controlled series capacitor system.

3. A subsynchronous resonance mitigation system according to claim 2 wherein the thyristor controlled series capacitor system comprises a capacitor in series with the transmission line, and a thyristor switched inductive commutating circuit in parallel with the capacitor, the commutating circuit having a thyristor valve responsive to the firing command to conduct a thyristor current pulse therethrough.

4. A subsynchronous resonance mitigation system according to claim 1 wherein the coupling apparatus comprises a voltage source inverter coupling apparatus.

5. A subsynchronous resonance mitigation system according to claim 4 wherein the voltage source inverter coupling apparatus comprises:
   a voltage source inverter;
   a coupling transformer coupling the voltage source inverter to the transmission line; and
   an energy storing device coupled to the voltage source inverter.

6. A subsynchronous resonance mitigation system according to claim 1 wherein the coupling apparatus comprises a current source inverter coupling apparatus.

7. A subsynchronous resonance mitigation system according to claim 6 wherein the current source inverter coupling apparatus comprises:
   a current source inverter;
   a coupling transformer coupling the current source inverter to the transmission line; and
   an energy storing inductor coupled to the current source inverter.

8. A subsynchronous resonance mitigation system according to claim 1 wherein the coupling apparatus comprises a static phase shifter.

9. A subsynchronous resonance mitigation system according to claim 8 wherein the static phase shifter comprises:
   a series transformer with mutually magnetically coupled series and excited windings, the series winding for coupling in series with the transmission line;
   a regulating transformer with mutually magnetically coupled exciting and regulating windings, the exciting winding for receiving power from the transmission line;
   a switching network coupling together the regulating winding of the regulating transformer with the excited winding of the series transformer, the switching network responsive to the firing command for establishing a nominal voltage level on the series transformer series winding; and
   a modulator responsive to the firing command for modulating the voltage of the series transformer series winding about the nominal voltage level.

10. A subsynchronous resonance mitigation system according to claim 1 wherein the coupling apparatus is coupled to the transmission line at a location remote from the generator.

11. A subsynchronous resonance mitigation system according to claim 1 wherein:
   the system further includes a transmission line sensor monitoring a parameter of the power flowing through the transmission line; and
   the firing time controller provides the firing command in response to the transmission line sensor.

12. A subsynchronous resonance mitigation system according to claim 11 wherein the transmission line sensor is coupled to the transmission line at a location remote from the generator.

13. A subsynchronous resonance mitigation system according to claim 11 wherein:
   the transmission line sensor comprises a current sensor monitoring a line current flowing through the transmission line, and a first voltage sensor monitoring a line to neutral voltage of the transmission line; and
   the higher-level controller generates the voltage command in response to the current sensor and first voltage sensor.

14. A subsynchronous resonance mitigation system according to claim 13 wherein the higher-level controller includes a velocity transducer responsive to the current sensor and first voltage sensor, and a conditioner responsive to the velocity transducer for providing the voltage command.

15. A subsynchronous resonance mitigation system according to claim 13 wherein:
   the transmission line sensor comprises a second voltage sensor monitoring a transmission line voltage across the coupling apparatus; and the firing time controller provides the firing command in response to the current sensor and the second voltage sensor.

16. A subsynchronous resonance mitigation system according to claim 15 wherein at least one of the current sensor, the first voltage sensor, and the second voltage sensor is coupled to the transmission line at a location remote from the generator.

17. A subsynchronous resonance mitigation system according to claim 1 wherein the generator speed monitoring device comprises a velocity transducer.

18. A subsynchronous resonance mitigation system according to claim 17 wherein:
the velocity transducer includes a reference frame transformation device and a velocity synthesizer responsive thereto; and
the higher-level controller includes a conditioner responsive to the velocity synthesizer for generating the voltage command.

19. A subsynchronous resonance mitigation system according to claim 17 wherein:
the velocity transducer includes a reference frame transformation device for transforming the line current and the line to neutral voltage into a direct current signal, a quadrature current signal, a direct voltage signal, and a quadrature voltage signal representing respective direct current, quadrature current, direct voltage, and quadrature voltage at the generator;
the velocity transducer includes a velocity synthesizer responsive to the direct current signal, quadrature current signal, direct voltage signal, and quadrature voltage signal for generating a synthesized generator velocity signal; and
the higher-level controller includes a conditioner for generating the voltage command in response to the synthesized generator velocity signal.

20. A subsynchronous resonance mitigation system according to claim 1 wherein the generator speed monitoring device synthesizes the generator speed based on a synchronously rotating reference frame rotating at a fundamental system frequency.

21. A subsynchronous resonance mitigation system according to claim 1 wherein:
the system further includes a transmission line sensor monitoring a parameter of the power flowing through the transmission line; and
the generator speed monitoring device determines the transmission line impedance in response to the transmission line power sensor for synthesizing the generator speed.

22. A subsynchronous resonance mitigation system according to claim 1 wherein the generator speed monitoring device synthesizes the generator speed based on transmission line characteristics stored within an impedance memory device.

23. A subsynchronous resonance mitigation system according to claim 1 wherein the higher-level controller includes a conditioner responsive to the generator speed monitoring device for producing the voltage command.

24. A subsynchronous resonance mitigation system according to claim 23 wherein the conditioner includes a first order wash-out stage responsive to the generator speed monitoring device, a phase compensation device, and a limiter coupled in series to the phase compensation device.

25. A subsynchronous resonance mitigation system according to claim 24 wherein the phase compensation device includes a first order lead/lag stage coupled to the first order wash-out stage, and a complex second order lead/lag stage coupled to the first order lead/lag stage.

26. A subsynchronous resonance mitigation system according to claim 1 wherein:
the generator speed monitoring device comprises a telemetering generator speed sensor for measuring the generator speed at a location local to the generator, and for transmitting the measured generator speed to the higher-level controller; and
the higher-level controller includes a conditioner responsive to the transmitted measured generator speed for generating the voltage command.

27. A subsynchronous resonance mitigation system for damping subsynchronous resonance oscillations occurring in a generator from a transmission line coupled to the generator, comprising:
a coupling apparatus for coupling to the transmission line, the coupling apparatus responsive to a firing command to introduce subsynchronous resonance mitigating currents into the transmission line;
a higher-level controller for synthesizing the generator speed based on a rotating reference frame, and producing in response thereto a voltage command; and
a firing time controller responsive to the voltage command for providing the firing command to the coupling apparatus.

28. A subsynchronous resonance mitigation system according to claim 27 wherein the rotating reference frame rotates synchronously at the fundamental frequency of the transmission line.

29. A subsynchronous resonance mitigation system according to claim 27 wherein the coupling apparatus is coupled to the transmission line at a location remote from the generator.

30. A method of damping subsynchronous resonance oscillations occurring in a generator from a coupling apparatus coupled to the generator by a transmission line, the coupling apparatus responsive to a firing command, the method comprising the steps of:
determining a speed of the generator;
generating a voltage command in response to the determined generator speed;
generating a firing command signal in response to the voltage command and the monitored parameter of power flowing through the transmission line; and
introducing subsynchronous resonance mitigating currents into the transmission line through the coupling apparatus in response to the firing command.

31. A method of damping subsynchronous resonance oscillations according to claim 30 wherein the determining step comprises measuring the generator speed at a location local to the generator, and transmitting the measured generator speed to the higher-level controller.

32. A method of damping subsynchronous resonance oscillations according to claim 30 wherein the determining step comprises synthesizing the generator speed based on a rotating reference frame.

33. A method of damping subsynchronous resonance oscillations according to claim 30 wherein:

the method further includes the step of monitoring a parameter of the power flowing through the transmission line; and the generating step comprises generating the firing command signal in response to the monitored parameter of power flowing through the transmission line.

34. A method of damping subsynchronous resonance oscillations according to claim 33 wherein the step of monitoring comprises the steps of:

monitoring a line current flowing through the transmission line; and monitoring a line to neutral voltage of the transmission line.

35. A method of damping subsynchronous resonance oscillations according to claim 34 wherein the step of determining a generator speed comprises the steps of synthesizing a remote generator speed in response to the monitored line current and the monitored line to neutral voltage of the transmission line.

36. A method of damping subsynchronous resonance oscillations according to claim 35 wherein the step of generating a voltage command comprises the steps of phase conditioning and gain conditioning the synthesized generator speed signal with a broad-band transfer function comprising first and second order transfer functions.

37. A method of damping subsynchronous resonance oscillations according to claim 30 wherein:

the method further includes the step of predicting an upcoming firing time for issuing the voltage command; and the step of generating a firing command signal comprises generating a synchronized firing command signal at the predicted upcoming firing time in response to the voltage command and the monitored line current.

38. A method of damping subsynchronous resonance oscillations according to claim 30 wherein the step of generating a voltage command comprises the steps of:

transforming the monitored line current and the monitored line to neutral voltage into a direct current signal, a quadrature current signal, a direct voltage signal, and a quadrature voltage signal representing respective direct current, quadrature current, direct voltage, and quadrature voltage at the generator;

generating a synthesized generator speed signal in response to the direct current signal, quadrature current signal, direct voltage signal, and quadrature voltage signal; and generating the voltage command by conditioning the synthesized generator speed signal.

39. A method of damping subsynchronous resonance oscillations according to claim 30 wherein:

the method includes the steps of monitoring a transmission line voltage across the coupling apparatus and predicting therefrom an upcoming firing time; and the step of generating the synchronized firing command signal comprises the step of generating the synchronized firing command signal at the predicted upcoming firing time.

40. A higher-level controller for a subsynchronous resonance mitigation system for damping subsynchronous resonance oscillations occurring in a generator from a transmission line coupled to the generator, the subsynchronous resonance mitigation system including a coupling apparatus in series with the transmission line and responsive to a firing command for introducing subsynchronous resonance mitigating currents into the transmission line, and a firing time controller responsive to a voltage command for providing the firing command to the coupling apparatus, higher-level controller comprising a generator speed monitoring device, and a conditioner responsive to the generator speed monitoring device for generating the voltage command.

41. A higher-level controller according to claim 40 wherein the generator speed monitoring device comprises a velocity transducer including a reference frame transformation device, and a velocity synthesizer coupled in series between the reference frame transformation device and the conditioner.

42. A higher-level controller according to claim 40 wherein the generator speed monitoring device comprises a telemetering generator speed sensor for measuring the generator speed at a location local to the generator, and for transmitting the measured generator speed to the higher-level controller.

43. A higher-level controller according to claim 40 wherein the generator speed monitoring device synthesizes the generator speed based on a rotating reference frame.

44. A vernier firing time controller for driving a coupling apparatus of a subsynchronous resonance mitigation system for remotely damping subsynchronous resonance oscillations occurring in a generator coupled thereto by a transmission line, the coupling apparatus responsive to a firing command, a transmission line sensor monitoring a parameter of the power flowing through the transmission line, and a higher-level controller having a generator speed monitoring device and producing in response thereto a voltage command, the vernier firing time controller comprising:

a coupling apparatus predictor responsive to the transmission line sensor for predicting an initial voltage;

a limiter for limiting the initial voltage and the voltage command received from the higher-level controller to provide a limited final voltage;

a storage device for determining a predicted firing angle from the limited final voltage and the predicted initial voltage;

a synchronizer for generating a first timing signal in response to the monitored line current; and a firing time computer responsive to the first timing signal and the predicted firing angle for generating the firing command to introduce subsynchronous resonance mitigating currents into the transmission line through the coupling apparatus.

* * * * *